US008428074B2

(12) United States Patent
Nag et al.

(10) Patent No.: US 8,428,074 B2
(45) Date of Patent: Apr. 23, 2013

(54) BACK-TO BACK H.323 PROXY GATEKEEPER

(75) Inventors: Siddhartha Nag, Holmdel, NJ (US); Bo Shu, Somerset, NJ (US); Rahul Gulati, Lawrence Harbor, NJ (US); Ilana Polyak, Staten Island, NY (US)

(73) Assignee: Prom KS Mgmt Limited Liability Company, Wilmington, DE (US)

( * ) Notice: Subject to any disclaimer, the term of this patent is extended or adjusted under 35 U.S.C. 154(b) by 566 days.

(21) Appl. No.: 11/409,661

(22) Filed: Apr. 24, 2006

(65) Prior Publication Data

US 2006/0245419 A1  Nov. 2, 2006

Related U.S. Application Data

(60) Provisional application No. 60/676,626, filed on Apr. 29, 2005.

(51) Int. Cl.
*H04L 12/28* (2006.01)
*H04L 12/66* (2006.01)

(52) U.S. Cl.
USPC .......................................... 370/401; 370/352

(58) Field of Classification Search .................. 370/401, 370/352
See application file for complete search history.

(56) References Cited

U.S. PATENT DOCUMENTS

| 5,394,522 A | 2/1995 | Sanchez-Frank et al. |
| 5,640,595 A | 6/1997 | Baugher et al. |
| 5,809,282 A | 9/1998 | Cooper et al. |
| 5,826,242 A | 10/1998 | Montulli |
| 5,831,975 A | 11/1998 | Chen et al. |
| 5,884,037 A | 3/1999 | Aras et al. |

(Continued)

FOREIGN PATENT DOCUMENTS

| EP | 632673 | 1/1995 |
| EP | 1017200 | 7/2000 |

(Continued)

OTHER PUBLICATIONS

"Non Final Office Action", U.S. Appl. No. 11/183,156, (Jul. 27, 2009), 11 pages.

(Continued)

*Primary Examiner* — Mark Rinehart
*Assistant Examiner* — Angel Brockman
(74) *Attorney, Agent, or Firm* — Brundidge & Stanger, P.C.

(57) ABSTRACT

Disclosed herein is a method of executing the RAS stage up to the set-up stage in a H.323 system. The H. 323 system comprises one or more third party gatekeepers and one or more end points. A transparent back-to-back proxy gatekeeper is introduced between a third party gatekeeper and end-points. Two sets of ports are created on the transparent back-to-back proxy gatekeeper. One set of ports represent themselves as end-points to the third party gatekeeper and the other set of ports represent themselves as known ports of the third party gatekeeper to the end point. A H.323 RAS request is intercepted transparently from an end-point to a third party gatekeeper. The H.323 RAS request is addressed to a well-known port number on the third party gatekeeper. The information of the H.323 RAS registration request is stored in a local persistent copy within the back-to-back proxy gatekeeper. The H.323 RAS registration request is passed to the well-known port number on the third party gatekeeper.

37 Claims, 12 Drawing Sheets

U.S. PATENT DOCUMENTS

| | | | |
|---|---|---|---|
| 5,903,735 | A | 5/1999 | Kidder et al. |
| 5,958,009 | A | 9/1999 | Friedrich et al. |
| 5,996,013 | A | 11/1999 | Delp et al. |
| 6,009,469 | A | 12/1999 | Mattaway et al. |
| 6,026,443 | A | 2/2000 | Oskouy et al. |
| 6,041,353 | A | 3/2000 | Hirata et al. |
| 6,046,981 | A | 4/2000 | Ramamurthy et al. |
| 6,054,987 | A | 4/2000 | Richardson |
| 6,061,723 | A | 5/2000 | Walker et al. |
| 6,092,113 | A | 7/2000 | Maeshima et al. |
| 6,104,721 | A | 8/2000 | Hsu |
| 6,108,310 | A | 8/2000 | Wilkinson et al. |
| 6,115,372 | A | 9/2000 | Dinha et al. |
| 6,125,397 | A | 9/2000 | Yoshimura et al. |
| 6,154,465 | A | 11/2000 | Pickett |
| 6,208,638 | B1 | 3/2001 | Rieley et al. |
| 6,209,033 | B1 | 3/2001 | Datta et al. |
| 6,212,562 | B1 | 4/2001 | Huang |
| 6,226,678 | B1 | 5/2001 | Mattaway et al. |
| 6,243,376 | B1 | 6/2001 | Ng et al. |
| 6,243,759 | B1 | 6/2001 | Boden et al. |
| 6,259,771 | B1 | 7/2001 | Kredo et al. |
| 6,298,120 | B1 | 10/2001 | Civanlar et al. |
| 6,301,229 | B1 | 10/2001 | Araujo et al. |
| 6,366,577 | B1 | 4/2002 | Donovan et al. |
| 6,370,154 | B1 | 4/2002 | Wickham |
| 6,377,546 | B1 | 4/2002 | Guerin et al. |
| 6,381,635 | B1 | 4/2002 | Hoyer et al. |
| 6,412,000 | B1 | 6/2002 | Riddle et al. |
| 6,418,139 | B1 | 7/2002 | Akhtar |
| 6,442,268 | B1 * | 8/2002 | Klaghofer et al. ............ 379/229 |
| 6,442,615 | B1 | 8/2002 | Nordenstam et al. |
| 6,463,089 | B1 | 10/2002 | Chauncey et al. |
| 6,477,572 | B1 | 11/2002 | Elderton et al. |
| 6,490,249 | B1 | 12/2002 | Aboul-Magd et al. |
| 6,493,348 | B1 | 12/2002 | Gelman et al. |
| 6,499,027 | B1 | 12/2002 | Weinberger |
| 6,515,966 | B1 | 2/2003 | Bardalai et al. |
| 6,519,254 | B1 | 2/2003 | Chuah et al. |
| 6,549,940 | B1 | 4/2003 | Allen et al. |
| 6,570,867 | B1 | 5/2003 | Robinson et al. |
| 6,594,265 | B1 | 7/2003 | Robinson et al. |
| 6,594,268 | B1 | 7/2003 | Aukia et al. |
| 6,594,279 | B1 | 7/2003 | Nguyen et al. |
| 6,606,668 | B1 | 8/2003 | MeLampy et al. |
| 6,611,516 | B1 | 8/2003 | Pirkola et al. |
| 6,639,981 | B1 | 10/2003 | Dunn et al. |
| 6,640,248 | B1 | 10/2003 | Jorgensen et al. |
| 6,643,258 | B1 | 11/2003 | Ise et al. |
| 6,647,208 | B1 | 11/2003 | Kirby |
| 6,654,803 | B1 | 11/2003 | Rochford et al. |
| 6,667,968 | B1 * | 12/2003 | Tran ............... 370/352 |
| 6,675,387 | B1 | 1/2004 | Boucher et al. |
| 6,678,729 | B1 | 1/2004 | Ahoor et al. |
| 6,680,943 | B1 | 1/2004 | Gibson et al. |
| 6,690,678 | B1 | 2/2004 | Basso et al. |
| 6,714,987 | B1 | 3/2004 | Amin et al. |
| 6,728,365 | B1 | 4/2004 | Li et al. |
| 6,738,383 | B1 | 5/2004 | Killand et al. ............... 370/400 |
| 6,744,767 | B1 | 6/2004 | Chiu et al. |
| 6,751,677 | B1 * | 6/2004 | Ilnicki et al. ............... 719/316 |
| 6,771,661 | B1 | 8/2004 | Chawla et al. |
| 6,775,701 | B1 | 8/2004 | Pan et al. |
| 6,798,786 | B1 | 9/2004 | Lo et al. |
| 6,804,224 | B1 | 10/2004 | Schuster et al. |
| 6,831,932 | B1 | 12/2004 | Boyle et al. |
| 6,870,845 | B1 | 3/2005 | Bellovin et al. |
| 6,904,110 | B2 | 6/2005 | Trans et al. |
| 6,909,708 | B1 | 6/2005 | Krishnaswamy et al. |
| 6,910,074 | B1 | 6/2005 | Amin et al. |
| 6,925,076 | B1 | 8/2005 | Dalglc et al. ............... 370/352 |
| 6,937,566 | B1 | 8/2005 | Forslow |
| 6,940,814 | B1 | 9/2005 | Hoffman |
| 6,967,958 | B2 | 11/2005 | Ono et al. |
| 6,973,027 | B1 * | 12/2005 | Shaffer et al. ............... 370/218 |
| 6,977,896 | B1 | 12/2005 | Kobayashi |
| 6,985,957 | B2 * | 1/2006 | Fujita ............... 709/229 |
| 7,002,993 | B1 | 2/2006 | Hohaban et al. |
| 7,013,338 | B1 | 3/2006 | Nag et al. |
| 7,016,375 | B1 | 3/2006 | Rosenberg et al. |
| 7,051,070 | B2 * | 5/2006 | Tuttle et al. ............... 709/203 |
| 7,072,295 | B1 | 7/2006 | Benson et al. |
| 7,075,915 | B1 | 7/2006 | Gustke |
| 7,099,301 | B1 * | 8/2006 | Sheu ............... 370/352 |
| 7,124,187 | B1 | 10/2006 | Kodialam et al. |
| 7,136,377 | B1 | 11/2006 | Tweedly et al. |
| 7,143,152 | B1 | 11/2006 | Elman et al. |
| 7,209,473 | B1 | 4/2007 | Mohaban et al. |
| 7,221,384 | B2 * | 5/2007 | Mueller et al. ............. 348/14.01 |
| 7,221,662 | B2 | 5/2007 | Koistinen et al. |
| 7,266,683 | B1 | 9/2007 | Naq |
| 7,266,832 | B2 * | 9/2007 | Miller ............... 725/34 |
| 7,269,657 | B1 | 9/2007 | Alexander et al. |
| 7,274,662 | B1 | 9/2007 | Kalmanek, Jr. et al. |
| 7,280,528 | B1 | 10/2007 | Polit et al. |
| 7,305,000 | B2 * | 12/2007 | Horiba ............... 370/401 |
| 7,480,305 | B1 * | 1/2009 | Somasundaram ............ 370/401 |
| 7,606,146 | B1 | 10/2009 | Pan et al. |
| 7,693,062 | B2 | 4/2010 | Perkins et al. |
| 7,774,468 | B1 | 8/2010 | Nag et al. |
| 7,924,849 | B2 | 4/2011 | Gallant et al. |
| 2002/0015387 | A1 | 2/2002 | Houh et al. |
| 2002/0030696 | A1 * | 3/2002 | Twinkwalder et al. ....... 345/700 |
| 2002/0049841 | A1 | 4/2002 | Johnson et al. |
| 2002/0049860 | A1 | 4/2002 | Koistinen |
| 2002/0120741 | A1 | 8/2002 | Webb et al. |
| 2002/0152305 | A1 | 10/2002 | Jackson et al. |
| 2002/0174227 | A1 | 11/2002 | Hartsell et al. |
| 2002/0188720 | A1 | 12/2002 | Terrell et al. |
| 2002/0199012 | A1 | 12/2002 | Cable et al. |
| 2003/0026423 | A1 | 2/2003 | Unger et al. |
| 2003/0028535 | A1 * | 2/2003 | Sheldon et al. ............... 707/10 |
| 2003/0046396 | A1 | 3/2003 | Richter et al. |
| 2003/0053463 | A1 | 3/2003 | Vikberg et al. |
| 2003/0091049 | A1 | 5/2003 | Abe et al. |
| 2003/0126287 | A1 | 7/2003 | Charny et al. |
| 2003/0219029 | A1 | 11/2003 | Pickett |
| 2004/0039820 | A1 | 2/2004 | Colby et al. |
| 2004/0057435 | A1 | 3/2004 | Ruyle et al. ............... 370/395.5 |
| 2004/0073641 | A1 | 4/2004 | Minhazuddin et al. |
| 2004/0172464 | A1 | 9/2004 | Nag ............... 709/223 |
| 2004/0205239 | A1 | 10/2004 | Doshi et al. |
| 2005/0018652 | A1 * | 1/2005 | Crouch et al. ............... 370/352 |
| 2005/0044161 | A1 * | 2/2005 | Fujita ............... 709/208 |
| 2005/0083842 | A1 | 4/2005 | Yang et al. |
| 2005/0128951 | A1 | 6/2005 | Chawla et al. |
| 2005/0138204 | A1 | 6/2005 | Iyer et al. |
| 2005/0198261 | A1 * | 9/2005 | Durvasula et al. ............ 709/224 |
| 2005/0210292 | A1 * | 9/2005 | Adams et al. ............... 713/201 |
| 2006/0020694 | A1 | 1/2006 | Nag et al. |
| 2006/0056298 | A1 | 3/2006 | Nag et al. |
| 2007/0168517 | A1 | 7/2007 | Weller et al. |
| 2009/0296734 | A1 | 12/2009 | Nag |

FOREIGN PATENT DOCUMENTS

| | | |
|---|---|---|
| JP | 07105103 | 4/1995 |
| WO | WO 01/05115 | 12/2000 |
| WO | WO-0077988 | 12/2000 |
| WO | WO-0131939 | 5/2001 |
| WO | WO-0213023 | 2/2002 |
| WO | WO-0217036 | 2/2002 |

OTHER PUBLICATIONS

Aggarwal, Alok et al., "Efficient Routing in Optical Networks", *Journal of the ACM*. vol. 43, Issue 6. ACM Press. Nov. 1996., (Nov. 1996), pp. 973-1001.

Maxemchuk, N "Applying packet techniques to cellular radio", Wireless Networks. vol. 5, Issue 6. Dec. 1999. Kluwer Academic Publishers.,(Dec. 1999), 519-536.

"Non-Final Office Action", U.S. Appl. No. 09/634,035, (Mar. 26, 2004), 16 Pages.

"Final Office Action", U.S. Appl. No. 09/634,035, (Nov. 8, 2004), 26 Pages.

"Notice of Allowance", U.S. Appl. No. 09/634,035, (Jul. 22, 2005), 6 pages.

Lee, K. "Adaptive network support for mobile multimedia", *1st Annual International Conference on Mobile Computing and Networking*, ISBN 0897919142,(1995), 13 pages.

Terzis, A. et al., "Reservations for aggregate traffic: experiences from an RSVPtunnels implementation", *1998 Sixth 6th International Workshop on Quality of Service(IWQoS)*, ISBN 0780344820,(1998), 3 pages.

Terzis, A. et al., "RSVP Operation Over IP Tunnels", *Request for Comments (RFC)* 2746, (Jan. 2000), 25 Pages.

Baker, L et al., "Aggregation of RSVP for IPv4 and IPv6 Reservations", Retrieved from: <http://www.ietf.org/rfc/rfc3175.txt?number=3175> on Sep. 2001, (Sep. 2001), 34 pages.

Braden, R et al., "RFC2205 Resource ReSerVation Protocol (RSVP) Version 1 Functional Specification", Printed from Internet at: <http://www.faqs.org/rfcs/rfc2205.html> on Sep. 1997, (Sep. 1997), 79 pages.

Zhu, C et al., "RFC 2190 RTP Payload Format for H.263 Video Streams" Printed from Internet at http://www.faqs.org/rfcs/rfc2190.html on Sep. 1997, 10 pages.

Handley, M et al., "SIP Session Initiation Protocol", Printed from Internet at ftp://ftp.isl.edu/in-notes/rfc2543.txt on Mar. 1999, 143 pages.

"SIP Session Initiation Protocol", Printed from Internet at http://www.cs.columbia.edu/sip, Updated Aug. 2004, 1 page.

"SIP Session Initiation Protocol Implementations News", Printed from Internet at http://www.cs.columbia.edu/sip/news.html, Updated Aug. 2004, 4 pages.

"Measures network performance and predicts the impact of changes Chariot", *2004 NetIQ Corporation*, 2 pages.

"NetIQ Chariot", Printed from Internet at http://www.netiq.com/products/chr/default.asp?print=true, 1993-2004 NetIQ Corporation, 1 page.

"Delivers comprehensive service management for windows UNIX and Linux systems and applications", *NetIQ AppManager Suite 2004 NetIQ Corporation*, 4 pages.

"Delivers Enterprise VoIP QoS and Management", *AppManager for VoIP 2004 NetIQ Corporation*, 4 pages.

"NetIQ's VoIP Management Solution", *2004 NetIQ Corporation*, 2 pages.

"NetIQ Appmanager for VoIP", *1993-2004 NetIQ Corporation*, Printed from the Internet at http://www.netiq.com/products/am/modules/voip.asp?print=true, 1 page.

Pearsall, S et al., "Doing a VoIP Assessment with Vivinet Assessor", *NetIQ Work Smarter 2001-2002 NetIQ Corporation*, 19 pages.

"Delivers the leading software solution for assessing a data network's readiness for VoIP" *Vivinet Assessor 2004 NetIQ Corporation*, 2 pages.

"NetIQ Vivinet Assessor", Printed from the Internet at http://www.netiq.com/products/va/default.asp?print=true, 1993-2004 NetIQ Corporation, 1 page.

"Pinpoints VoIP quality problems in minutes", *Vivinet Diagnostics 2004 NetIQ Corporation*, 2 pages.

"NetIQ Vivinet Diagnostics", Printed from the Internet at http://www.netiq.com/products/vd/default.asp?print=true, 1993-2004 NetIQ Corporation, 1 page.

"NetIQ VoIP Management Solution", Printed from the Internet at http://www.netiq.com/solutions/voip/default.asp?print=true, 1993-2004 NetIQ Corporation, 1 page.

"Micromuse Products & Solutions Netcool Suite Overview", Printed from the Internet at http://www.micromuse.com/products_sols/index.html, Micromuse Inc,(2004), 9 pages.

"Netcool Solutions for Voice Over IP", *Realtime Service Quality Management for IP Telephony Services*, Micromuse Inc, 4 pages.

"Netcool Solutions for Enterprise", *End to End Business and Service Assurance*, Micromuse Inc,5 pages.

"Netcool System Service Monitors White Paper", *Including Netcool Application Service Monitors*, Micromuse Inc,(2003), 8 pages.

"Netcool Monitors Product Family Realtime and Trended Performance", *Status and Service Monitoring*, Micromuse Inc,(2004), 4 pages.

"Netcool Usage Service Monitors White Paper (Netcool/USMs)", *2003 Micromuse Inc*, (2003), 11 pages.

"Netcool Precision for IP Networks Discovery & Topology Based RCA", *Micromuse Inc.* 2002. 2 pages.

"Realtime Event Management for Business and Service Assurance", *Micromuse Inc*, 4 pages.

Farrell, C "Grappling With Management of IP Telephony", *Internet Telephony*, Technology Marketing Corporation,(May 2004), 2 pages.

"NetIQ VoIP Manager Connector for Netcool/OMNIbus", *Micromuse Inc*, 1 page.

Allen, Pete "Putting new service management tactics to work Service providers can make smarter use of service management technology", *ServerWorld*, vol. 16, No. 4 Apr. 2002, (Apr. 2002), 3 pages.

"HP OpenView Network Services Management Business blueprint", *2004, Hewlett-Packard Development Company LP*, 6 pages.

"Management Software IP telephony management solutions overview & features", Printed from the Internet at http://www.openview.hp.com/cgi-gin/pf-new.cgi?IN=hp//partners/nnm/prod_nnm_0002.h..., Hewlett-Packard Development Company LP,(2004), 1 page.

"Management Software Alliance with Cisco Systems Inc", Printed from the Internet at http://www.openview.hp.com/cgi-bin/pf-new.cgi?IN=hp//partners/alliance/pall_0001.html, Hewlett-Packard Development Company LP,(2004), 2 pages.

"HP OpenView Performance Insight Report Pack for IP Telephony 1.2", *2004, Hewlett-Packard Development Company LP*, (2004), 8 pages.

"hp OpenView", *glanceplus and glanceplus pak product brief*, Hewlett-Packard Company,(2003), 6 pages.

"HP OpenView Performance Manager", *Performance Monitor and Performance Agent data sheet*, Hewlett-Packard Development Company LP,(2003), 4 pages.

"HP Open View", *Service Quality Manager 1.1 data sheet*, Hewlett-Packard Development Company LP,(2003), 4 pages.

"hp OpenView", *service information portal 3.1 product brief*, Hewlett-Packard Company,(2003), 4 pages.

"hp OpenView", *problem diagnosis 1.1 product brief*, Hewlett-Packard Company,(2002), 4 pages.

"HP OpenView Performance Insight Pack for Infrastructure Usage", *2004, Hewlett-Packard Company LP*, (2004), 6 pages.

"HP OpenView", *Network Node Manager Smart Plug-in for Advance Routing 1.0 Data sheet*, 2003-2004, Hewlett-Packard Development Company LP, 4 pages.

"HP OpenView", *Customer Views 1.4 for Network Node Manager data sheet*, Hewlett-Packard Development Company LP,(2003), 4 pages.

"Hewlett-Packard OpenView about Hewlett-Packard OpenView", Printed from the Internet at http://www.managementsoftware.hp.com/cgi-bin/pf-new.cgi?IN=hp//about/index.html, Hewlett-Packard Development Company LP,(2004), 2 pages.

"hp OpenView", *service quality manager product overview*, Hewlett-Packard Company,(2003), 16 pages.

"Intelligent Diagnostics for Networks Beyond root cause analysis", *A white paper from HP preliminary*, Hewlett-Packard Development Company LP,(2003), 12 pages.

"HP OpenView Operations 7.x for Windows", *Firewall Configuration white paper*, Hewlett-Packard Company,(2002), 60 pages.

"Gain strategic advantage with HP IT Service Management", *White Paper*, Hewlett-Packard Development Company LP,(2003), 8 pages.

Harbaum, T et al., "Layer 4+Switching with QOS Support for RTP and HTTP", *Global Telecommunication Conference*, GLOBECOM '99,(1999), 6 pages.

"Final Office Action", U.S. Appl. No. 11/267,922, (May 14, 2009), 14 pages.

"Non Final Office Action", U.S. Appl. No. 11/267,922, (Sep. 22, 2008), 10 pages.

Kankkunen, et al., "VoIP over MPLS Framework Internet Draft", Retrieved from Internet at http://tools.ietf.org/html/draft-kankkunen-vompls-fw-01, Internet Engineering Task Force, 2000, 58 pages.

"HPSR 2002 Technical Program", Retrieved from http://www.ieice.org/hpsr2002/detail.html, 2003, 8 pages.

"MeraVoice over IP Solutions", Retrieved from http://www.mera-voip.com/support/glossary.php, VOIP Technology and Product: VoIP Glossary, 2003, 6 pages.

"Entities", Retrieved from <http://ai3.asti.dost.gov.ph/h.323/entities.htm> on Dec. 11, 2003, 2003, pp. 1-6.
"CISCO IOS Software Release 12.0 T", Retrieved from http://www.cisco.com/enUS/products/sw/iosswrel/ps1830/products>on Dec. 11, 2003, 12 pages.
"The Drivers for Voice Over IP", Retrieved from http://www.voip-calculator.com/drivers.html, 2003, 3 pages.
"Voice over IP Protocols for Voice Transmission", Retrieved from http://voip-calculator.com/protocols.html, 2003, 6 pages.
"H.323 Primer an Introduction to H.323", Retrieved from http://voip-calculator.com/h323primer.html, 2003, 5 pages.
"Administrivia Last Time Endpoint Admission Control Paper This Paper Explore Tradeoffs for This Type of Solution", *Suny-Binghamton, Lecture #24*, (2003), 8 pages.
"DiffServ the Scalable End-to-End QoS Model", *Cisco Systems*, 2001, 19 pages.
"Implementing DiffServ for End-to-End Quality of Service", *Cisco IOS Release 12.1(5)T*, 22 pages.
"Low Latency Queuing", *Cisco IOS Release 12.0(26)S*, 14 pages.
Blake, S et al., "An Architecture for Differentiated Services", Retrieved from:<http://www.ietf.org/rfc/rfc2475.txt>, The Internet Society, 1998,(Dec. 1998), 34 pages.
Blefari-Melazzi, N. et al., "Charging IP Network Services in a DiffServ Environment", *Proceedings of Advanced Internet Charging and QoS Technology 2001(ICQT'01) Workshop*, Vienna, Austria, Sep. 2001,(Aug. 2001), 11 pages.
Jamalipour, et al., "Next Generation Broadband Wireless Networks and Navigation Services", Retrieved from http://www.comsoc.org/livepubs/ci1/Public/2002/Feb/gstedjamal.html, Guest Editorial, 2003, 4 pages.
Roaten, "IP Telephony and EIC a Technical Overview", *Interactive Intelligence*, 1998, 9 pages.
Tewari, et al., "A New Call Admission Control Scheme for Real Time Traffic in Wireless Networks", *Conference on Convergent Technologies for Asia-Pacific Region*, vol. 4, Issue 15-17 Oct. 2003, TENCON 2003,(Oct. 2003), 5 pages.
Hwang, Junseok "A Market Based Model for the Bandwidth Management of Intserv DiffServ QoS Interconnection A Network Economic Approach", 2000, 204 pages.
Kim, et al., "A Dynamic Admission Control Scheme in a DiffServ Domain", *Workshop on High Performance Switching and Routing*, 2002, 5 pages.
Siler, et al., "Measurement Based Admission Control and Monitoring for Statistical Rate Latency Guarantees", *Proceedings of the 38th Conference on Decision& control*, Phoenix, AZ, Dec. 1999, 6 pages.
Almesberger, et al., "Scalable Resource Reservation for the Internet", *IEEE '1997*, (1997), pp. 18-27.
Nag, et al., "U.S. Appl. No. 11/038,445 entitled Differentiated Services (DiffServ) traffic admission control", U.S. Appl. No. 11/038,445 filed Jan. 18, 2005, 34 pages.
"AdventNet Products", Retrieved from http://a1132.g.akamai.net/7/1132/1581/1382cd01af18b6/www.adventnet.com/products.html on Sep. 13, 2000, AdventNet, 2 pages.
"Network Node Manager", Retrieved from http://www.openview.hp.com/products/nnm on Sep. 13, 2000, HP OpenView, 2 pages.
"Network Node Manager Interactive Demos", Retrieved from http://ovweb1.external.hp.com/nnminteract on Sep. 13, 2000, 2 pages.
"Cisco Network Management", Retrieved from http://ww.cisco.com/warp/public/44/jump/network_management.shtml on Sep. 13, 2000, 5 pages.
Greenstein, Larry "Transporting Voice Traffic Over Packet Networks", *International Journal of Network Management*, vol. 8, (1998), 227-234.
Muller, Nathan "Improving and Managing Multimedia Performance over TCP/IP Nets", *International Journal of Network Management*, vol. 8, (1998), 356-367.
Eder, M et al., "service Management Architectures Issues and Review", Retrieved from ft://ftp.isi.edu/in-notes/rfc3052.txt, (Jan. 2001), 12 pages.
Eder, M et al., "IP Service Management in the QoS Network", Retrieved from http://search.ietf.org/internet-drafts/draft-irtf-smrg-ipsmf-01.txt, (Nov. 2001), 15 pages.
"Advisory Action", U.S. Appl. No. 09/689,222, (Mar. 22, 2005), 3 pages.
"Advisory Action", U.S. Appl. No. 09/689,222, (Jun. 5, 2006), 3 pages.
"Final Office Action", U.S. Appl. No. 09/689,222, (Nov. 10, 2004), 12 pages.
"Final Office Action", U.S. Appl. No. 09/689,222, (Jul. 26, 2005), 7 pages.
"Final Office Action", U.S. Appl. No. 09/689,222, (Jul. 31, 2008), 8 pages.
"Non Final Office Action", U.S. Appl. No. 09/689,222, (Feb. 9, 2004), 13 pages.
"Non Final Office Action", U.S. Appl. No. 09/689,222, (Jan. 30, 2008), 10 pages.
"Non Final Office Action", U.S. Appl. No. 09/689,222, (Jul. 25, 2008), 10 pages.
"Non Final Office Action", U.S. Appl. No. 09/689,222, (Jan. 27, 2009), 9 pages.
"Restriction Requirement", U.S. Appl. No. 09/689,222, (Apr. 5, 2005), 5 pages.
"Notice of Allowance", U.S. Appl. No. 10/701,017, (Mar. 6, 2009), 6 pages.
"Notice of Allowance", U.S. Appl. No. 10/701,017, (Nov. 14, 2008), 9 pages.
"Notice of Allowance & Examiner Amendment with Allowed Claims", U.S. Appl. No. 10/701,017, (Jul. 2, 2008), 17 pages.
"Non-Final Office Action", U.S. Appl. No. 10/701,017, (Aug. 24, 2005), 11 pages.
"Non Final Office Action", U.S. Appl. No. 10/206,402, (Feb. 8, 2006), 21 pages.
"Non Final Office Action", U.S. Appl. No. 10/206,402, (Sep. 14, 2006), 8 pages.
"Non Final Office Action", U.S. Appl. No. 10/206,402, (Apr. 12, 2007), 7 pages.
"Notice of Allowance & Examiner Amendment", U.S. Appl. No. 10/206,402, (Jun. 21, 2007), 20 pages.
"International Search Report", International Application No. PCT/US2001/024878, (Dec. 19, 2001), 3 pages.
"International Search Report", International Application Serial No. PCT/US2003/035024, (May 28, 2004), 4 pages.
"European Search Report", Application No. EP03768594, (Mar. 24, 2006), 2 pages.
"International Search Report", International Application No. PCT/US2006/016094, (Aug. 22, 2007), 3 pages..
"Non-Final Office Action", U.S. Appl. No. 11/038,445, (Feb. 25, 2009), 25 pages.
"Vivinet Assessor; NetIQ", retrieved from internet at http://netiq.com/products/va/default.asp?print=true:, 1993-2004 NetIQ Corporation,(1993-2004), 1 page.
"Smart Way 2004", *Cisco Systems and Hewlett-Packard; 2004*, (2004), 4 pages.
"Final Office Action", U.S. Appl. No. 11/038,445, (Oct. 15, 2008), 22 pages.
"Non-Final Office Action", U.S. Appl. No. 11/038,445, (May 7, 2008), 8 pages.
"Allowed Claims", U.S. Appl. No. 10/701,017, (Mar. 6, 2009), 4 pages.
"Final Office Action", U.S. Appl. No. 11/038,445, (Oct. 1, 2009), 16 pages.
"Non-Final Office Action", U.S. Appl. No. 11/267,922, (Oct. 7, 2009), 15 pages.
"Notice of Allowance", U.S. Appl. No. 10/701,017, (Oct. 26, 2009), 4 pages.
USPTO; Final Office Action dated Feb. 26, 2010 in U.S. Appl. No. 11/267,922.
USPTO; Notice of Allowance dated Jun. 15, 2010 in U.S. Appl. No. 09/689,222.
USPTO; Notice of Allowance dated Jan. 27, 2010 in U.S. Appl. No. 09/689,222.
USPTO; Final Office Action dated Nov. 10, 2009 in U.S. Appl. No. 09/689,222.
USPTO; Office Action dated Feb. 3, 2011 in U.S. Appl. No. 12/873,075.

USPTO; Notice of Allowance dated Mar. 1, 2011 in U.S. Appl. No. 11/183,156.
USPTO; Office Action dated Sep. 29, 2010 in U.S. Appl. No. 11/183,156.
USPTO; Advisory Action dated Apr. 30, 2010 in U.S. Appl. No. 11/183,156.
USPTO; Final Office Action dated Feb. 3, 2010 in U.S. Appl. No. 11/183,156.
USPTO; Notice of Allowance dated Apr. 6, 2010 in U.S. Appl. No. 10/701,017.
USPTO; Notice of Allowance dated Dec. 31, 2009 in U.S. Appl. No. 10/701,017.
USPTO; Office Action dated Aug. 24, 2005 in U.S. Appl. No. 10/701,017.
USPTO; Office Action dated Feb. 23, 2011 in U.S. Appl. No. 12/538,677.
USPTO; Notice of Allowance dated Mar. 26, 2010 in U.S. Appl. No. 11/038,445.
USPTO; Advisory Action dated Dec. 16, 2009 in U.S. Appl. No. 11/038,445.
Netcool/Precision for IP Networks: Discovery & Topology-/Based /RCA, Micromuse, Inc., Retrieved from internet at: http://web.archive.org/web/20040716014651/www.micromuse.com/downloads/pdf_lit/precision_ip.pdf, Jul. 2004 (2 pages).
Cisco HP Smart Way 2004 Solution Brief, 2003, Cisco Systems and Hewlett-Packard (4 pages).
USPTO; Notice of Allowance dated Oct. 17, 2011 in U.S. Appl. No. 12/873,075.
USPTO; Office Action dated Sep. 7, 2011 in U.S. Appl. No. 12/538,677.
USPTO; Final Office Action dated Aug. 8, 2011 in U.S. Appl. No. 12/873,075.
USPTO; Notice of Allowance dated Jun. 13, 2011 in U.S. Appl. No. 11/183,156.

* cited by examiner

BACK-TO BACK H.323 PROXY GATEKEEPER

This application claims priority of provisional application 60/676,626 filed Apr. 29, 2005. This application is also related to U.S. patent application Ser. No. 09/634,035, now U.S. Pat. No. 7,013,338, filed Aug. 8, 2000 titled "Multiplexing Several Individual Application Sessions Over a Pre-Allocated Reservation Protocol Session"; U.S. patent application Ser. No. 10/206,402, now U.S. Pat. No. 7,266,683, filed Jul. 27, 2002, titled "Selective Encryption of Application Session Packets"; U.S. patent application Ser. No. 10/701,017, now U.S. Pat. No. 7,788,354, filed Nov. 3, 2003, titled "End-to-End Service Quality for Latency-Intensive Internet Protocol (IP) Applications in a Heterogeneous, Multi-Vendor Environment"; and U.S. patent application Ser. No. 11/038,445, now U.S. Pat. No. 7,774,468, filed Jan. 18, 2005, titled "Differentiated Services (DiffServ) Traffic Admission Control" (collectively, the "Related Applications"). The entirety of each of the aforementioned patent applications is hereby incorporated herein for all purposes.

BACKGROUND OF THE INVENTION

The International Telecommunication Union Telecommunication Standardization Section (ITU-T) Recommendation H.323 and related H.323-series Recommendations, including the following are herein referred to individually and collectively as the H.323 Standard: ITU-T Recommendation H.323 (2000), *Packet-Based Multimedia Communications Systems*; ITU-T Recommendation H.225.0 (2000), *Call Signaling Protocols and Media Stream Packetization for Packet Based Multimedia Communications Systems*; ITU-T Recommendation H.225.0—Annex G (1999), *Communication Between Administrative Domains*; ITU-T Recommendation H.245 (2000), *Control Protocol for Multimedia Communication*; ITU-T Recommendation H.246 (1998), *Interworking of H-Series Multimedia Terminals with H-Series Multimedia Terminals and Voice/Voiceband Terminals on GSTN and ISDN*; ITU-T Recommendation H.246—Annex C (2000), *ISDN User Part Function*-H.225.0; ITU-T Recommendation H.235 (2000), *Security and Encryption for H Series (H.323 and other H.245 based) Multimedia Terminals*; ITU-T Recommendation H.450.1 (1998), *Generic Functional Protocol for the Support of Supplementary Services in H.323*; ITU-T Recommendation H.450.2 (1998), *Call Transfer Supplementary Service for H.323*; ITU-T Recommendation H.450.3 (1998), *Call Diversion Supplementary Service for H.323*; ITU-T Recommendation H.450.4 (1999), *Call Hold Supplementary Service for H.323*; ITU-T Recommendation H.450.5 (1999), *Call Park and Call Pickup Supplementary Services for H.323*; ITU-T Recommendation H.450.6 (1999), *Call Waiting Supplementary Service for H.323*; ITU-T Recommendation H.450.7 (1999), *Message Waiting Indication Supplementary Service for H.323*; ITU-T Recommendation H.450.8 (2000), *Name Identification Supplementary Service For H.323*; ISO/IEC 11571 (1998), *Information Technology—Telecommunications and Information Exchange between Systems—Private Integrated Services Networks—Addressing*; ITU-T Recommendation Q.931 (1998), *ISDN User-Network Interface Layer 3 Specification for Basic Call Control*; ITU-T Recommendation H.283, *Remote Device Control Logical Channel Transport*.

H.323 is a standard that specifies components, protocols and procedures for implementing multimedia communication over packet-based networks. Examples of its application includes IP based telephony, video telephony, audio video and data, multipoint-multimedia communications, etc. H.323 networks comprise terminals, gateways, gatekeepers, and multipoint control units (MCU).

A gatekeeper is an H.323 entity on the network that provides services such as address translation and network access control for H.323 terminals, gateways and MCUs. Gatekeepers also provide services such as bandwidth management, accounting and dial plans. Gatekeepers are logically separated from H.323 endpoints such as terminals and gateways. Gatekeepers are optional in an H.323 network, but if a gatekeeper is present, end-points must use the services provided by the gatekeepers.

The registration admission and status (RAS) defines the call control services, including address translation, admissions control, zone management and bandwidth management. The gatekeeper controls and monitors call signaling messages between end-points.

The three distinct layers of a H.323 gatekeeper include the H.323 stack layer, gatekeeper core layer and gatekeeper application layer. The H.323 stack layer consists of basic registration admission and status (RAS), H.225, Q.931, H.245, Q.931, abstract syntax notation one (ASN.1) and RTP/RTCP stack functionalities. The gatekeeper core layer provides the gatekeeper infrastructure, where the H.323 messages received by the stack are put to context and call-control activity is performed. The gatekeeper application layer provides the application level access to the gatekeeper module for participating in the call-control activities.

The H.323 stack layer is the basic building block which takes care of initialization and setting up calls and channels, managing the calls and channels, and closing them. H.323 stack module receives all the messages from the transport packet (TPKT) layer and decodes the ASN.1 formatted message into a protocol value tree/protocol syntax tree (PVT/PST) structure for application access and manipulation.

The H.323 standard permits one and only one gatekeeper per zone. Application-aware service delivery appliances, such as media aggregators, aggregate voice and video traffic to and from enterprise sites enhance the performance of H.323 systems. There is a need for the inclusion of H.323 stack layer functionality within these media aggregators. The inclusion of H.323 stack layer functionality within these media aggregators enables the media aggregators to efficiently direct, aggregate and guarantee the end-to-end service quality of real-time traffic from site to site. However, in the H.323 systems, the H.323 stack layer functionality cannot be included in other devices such as a media aggregation manager because the H.323 standard permits only one gatekeeper per zone. Hence, there is a need to transparently introduce the H.323 stack layer functionality in devices such as the media aggregation manager.

SUMMARY OF THE INVENTION

The H.323 Standard permits only one gatekeeper per zone, in order to allow a network device to assume all or a subset of the gatekeeper functionality. There is a need for a transparent entity that may be logically interposed between the gatekeeper and end-points.

The method and system disclosed herein relates to a transparent back-to-back proxy gatekeeper positioned between a third party gatekeeper and end points. The back-to-back proxy gatekeeper assumes certain functionality of the third party gatekeeper while remaining transparent to the third party gatekeeper. The method and system and all their embodiments disclosed herein will be referred to as the back-to-back proxy gatekeeper (B2BPG).

A method is disclosed herein to enable the inclusion of the functionality of the H.323 stack layer in an application aware service delivery appliance such as a media aggregator located in a H.323 system. This will enable the media aggregator to retain pertinent information to perform quality of service (QoS) delivery. Retaining this pertinent information will enable the media aggregator to perform dynamic bandwidth reservation, QoS path allocation, IP flow concentration for RSVP, and perform QoS path admission control based on end-to-end view of the network and monitor and manage existing calls.

Another method disclosed herein provides a back-to-back proxy gatekeeper that handles the RAS stage up to the set-up stage.

Another method disclosed herein provides a back-to-back proxy gatekeeper that handles Q.931 incoming call set-up and call termination from the end point.

DETAILED DESCRIPTION OF THE INVENTION

Figure 1:
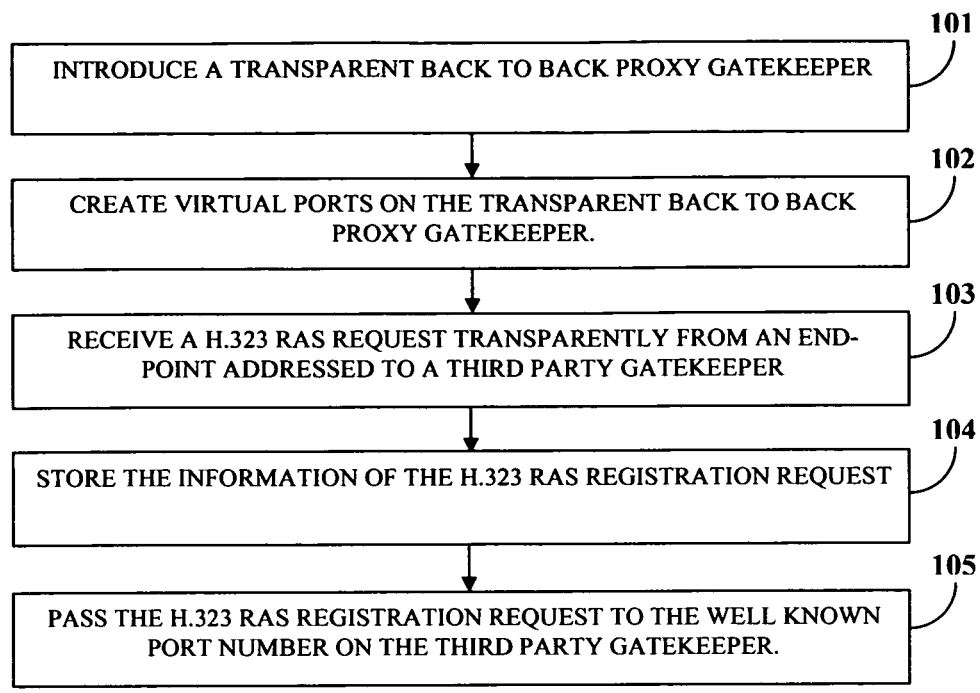
FIG. 1 illustrates the method for executing the RAS stage up to the set-up stage in a H.323 system using a B2BPG.

The following abbreviations and definitions listed below are used herein:

RAS—Registration, Admission and Status

RAS defines the protocol of communication between endpoints and gatekeepers. Examples of an end-point include terminals and gateways. The RAS protocol is used to perform registration, admission control, bandwidth changes, status, and disengage procedures between end-points and gatekeepers.

RRQ—Registration request

An RRQ is a RAS message wherein an end-point requests a specific gatekeeper for registration.

RCF—Registration confirm

An RCF is a RAS message that a gatekeeper sends to an end-point accepting the RRQ call from the end-point.

RRJ—Registration reject

An RRJ is a RAS message that a gatekeeper sends to the requesting endpoint in order to reject a registration request.

URQ—Unregistration request

An URQ is a bi-directional message sent by either the endpoint or the gatekeeper to terminate the association between a gatekeeper and an end-point.

UCF—Unregistration confirm

An UCF is a RAS message sent by a gatekeeper or an endpoint after accepting the URQ.

URJ—Unregistration reject

An URJ is a RAS message sent by a gatekeeper or an endpoint after rejecting the URQ.

DRQ—Disengage request

A DRQ is a RAS message that a gatekeeper or an end-point sends on terminating a call, to or from whom the call was initiated.

DCF—Disengage confirm

An DCF is a RAS message that a gatekeeper or an end-point sends on accepting the DRQ.

DRJ—Disengage reject

A DRJ is a RAS message that a gatekeeper or an end-point sends on rejecting the DRQ.

ARQ—Admission request

An ARQ is a RAS message that an end-point sends to a gatekeeper to whom it's registered for initiating a call and requesting access to a packet based network.

ACF—Admission confirm

An ACF is a RAS message that a gatekeeper sends after accepting an ARQ.

ARJ—Admission reject

An ARJ is a RAS message that a gatekeeper sends after rejecting an ARQ.

BRQ—Bandwidth change request

An end-point or the gatekeeper may attempt to modify the call bandwidth during a call using BRQ.

Systems and methods are described herein for providing a transparent entity herein referred to as a Back-to-Back H.323 Proxy Gatekeeper (B2BPG) on networks that provide services such as address translation and network access control for H.323 terminals, gateways and MCU's. According to one embodiment, an application aware service delivery appliance or media aggregation manager such as MediaIP described in co-pending related applications U.S. patent application Ser. No. 09/634,035, U.S. patent application Ser. No. 10/206,402, U.S. patent application Ser. No. 10/701,017, and U.S. patent application Ser. No. 11/038,445 assumes gatekeeper functionality and the major roles of a gatekeeper. Therefore, the MediaIP should either be transparent to the existing gatekeeper or replace it. Since replacement of gatekeepers in some instances is not feasible, a transparent entity that may logically reside between the gatekeeper and an end-point was developed to allow the MediaIP product to provide functionality of a Media Router. The gatekeeper herein will be referred to as the "third party gatekeeper".

In the following description, for purposes of explanation, numerous specific details are set forth in order to provide an understanding of the present invention. It will be apparent, however, to one skilled in the art that the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware and software.

Embodiments of the present invention may be provided as a computer program product which may include a machine-readable medium having stored thereon instructions which may be used to program a computer or other electronic device, to perform a process according to the methods described herein. The machine-readable medium may include, but is not limited to floppy diskettes, optical disks, compact disk read only memory (CD-ROMs), and magneto-optical disks, read only memory (ROMs), random access memory (RAMs), erasable programmable read only memory (EPROMs), electrically erasable programmable read only memory (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link, such as a modem or network connection.

While, by way of example, embodiments of the present invention are described with reference to a voice over internet protocol (VoIP) implementation, the present invention is applicable to various other network applications or services that are latency intensive, for example, those affected by jitter and/or transmission delays and/or that require real-time performance, such as applications based on human interactions, for example, collaborative software, on-line or web collaboration, voice conferencing, video conferencing, and real-time data communication and/or exchange, such as market data applications, financial transactions, and the like.

FIG. 1 illustrates the method for executing the RAS stage up to the set-up stage in a H.323 system using a B2BPG. A transparent B2BPG is introduced between third party gatekeepers and end-points 101. The B2BPG accepts RAS requests from the end-points, stores the information of the registration in a local persistent copy and passes the RAS message to the third party gatekeeper. When the third party gatekeeper responds to the relayed RAS message, the response is accepted by the B2BPG and relayed back to the originating end-point. For all intent and purposes, the B2BGP appears and functions as a gatekeeper to the end-points. However, the third party gatekeeper performs the actual gatekeeper functions. The third party gatekeeper views the B2BPG as end-points. The third party gatekeeper therefore treats all the H.323 RAS messages from the B2BPG as originating from an end-point, and responds to them accordingly.

Two sets of ports are created on the transparent back-to-back proxy gatekeeper (B2BPG) 102. The first set of ports represent themselves as end-points to the third party gatekeeper and the second set of ports represent themselves as the third party gatekeeper to the end-point. The H.323 RAS request addressed to the third party gatekeeper is transparently received at the second set of ports of the B2BPG 103. The H.323 RAS request is addressed to a well-known port number on the third party gatekeeper. The information of the H.323 RAS registration request is stored in a local persistent copy within the B2BPG 104 and the H.323 RAS registration request is then passed on to the well-known port number on the third party gatekeeper 105.

Figure 2:
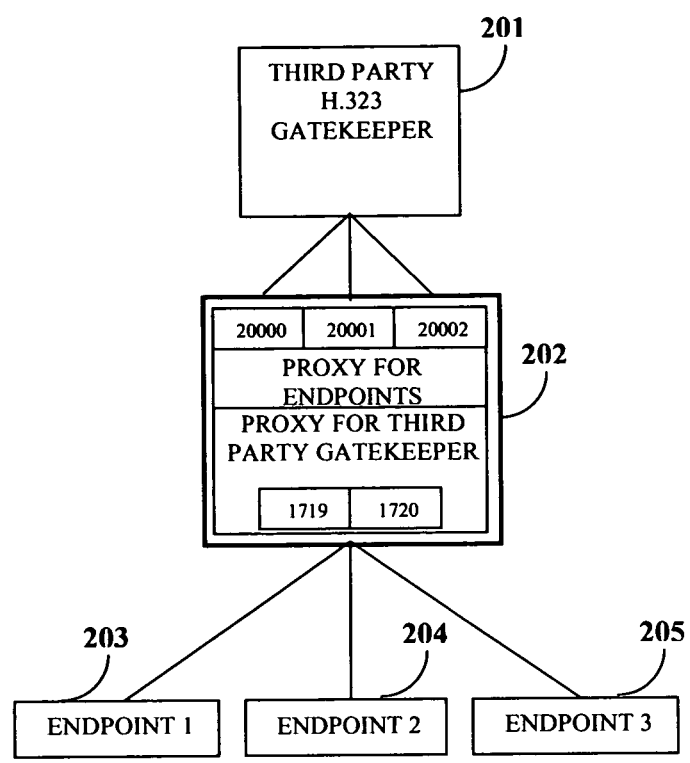
FIG. 2 illustrates two sets of ports on the B2BPG wherein the first set of ports represent the ports of the end-points to the third party gatekeeper, and the second set of ports represent the ports of the third party gatekeeper to the end-points.

FIG. 2 illustrates two sets of ports on the B2BPG 202 wherein the first set of ports represent the ports of the end-points 203, 204, 205 to the third party gatekeeper 201 and the second set of ports represent the ports of the third party gatekeeper 201 to the end-points 203, 204, 205. The B2BPG 202 behaves as a back-to-back proxy agent. The B2BPG 202 does not perform the core gate-keeping functionality of call routing and termination. Rather, the B2BPG 202 delegates the responsibility of call routing and termination to the third party gatekeeper 201.

The B2BPG 202 proxies as a third party gatekeeper 201 for the end-points 203, 204, 205 and proxies as an end-point to the third party gatekeeper 201.

The first set of ports on the B2BPG 202 are the well known port numbers 1719/1720. The end-points register to the B2BPG 202 by communicating to the port numbers 1719/1720. After the B2BPG 202 receives the message that is addressed to the port numbers 1719/1720, it stores an internal object and relays the registration message to the third party gatekeeper's 201 port number 1719/1720. The B2BPG 202 sends out the registration request to the third party gatekeeper from the same IP address but different ports, thereby mimicking different end-points 203, 204, 205.

Figure 3A:
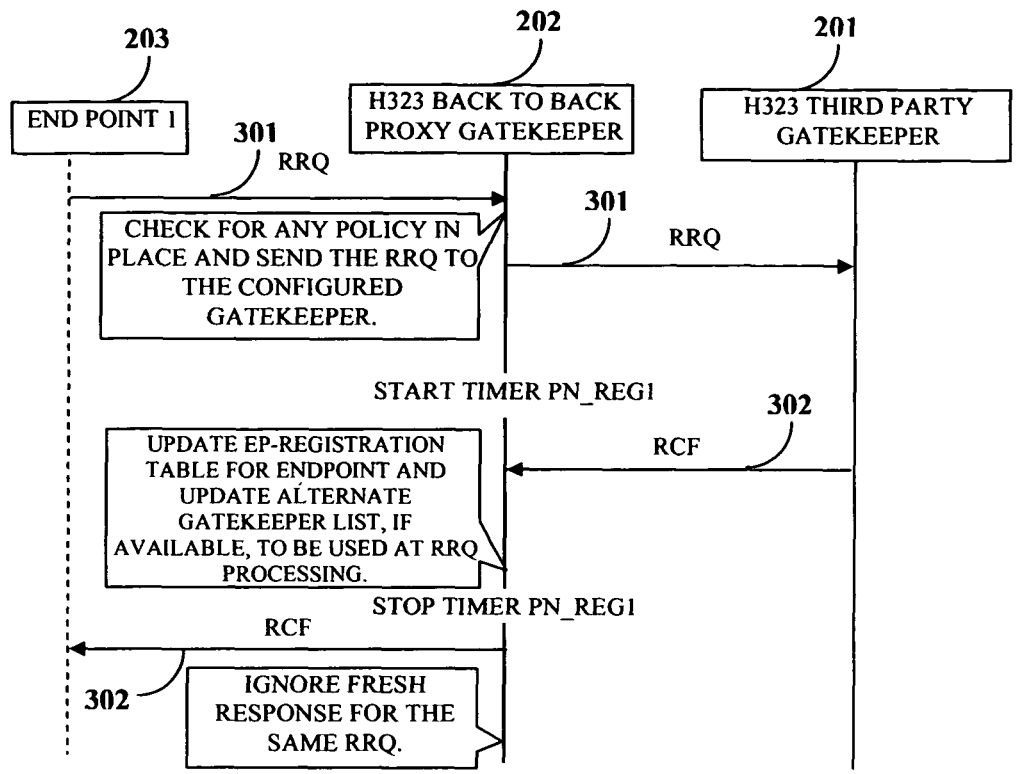
FIG. 3A illustrates the message sequence chart (MSC) for a registration request (RRQ) sent by end-points to a statically configured third party gatekeeper and its associated request confirmation (RCF).

FIG. 3A illustrates the message sequence chart (MSC) for a registration request (RRQ) 301 sent by end-points to a statically configured gatekeeper and its associated request confirmation (RCF) 302. A registration request (RRQ) 301 is sent by end-points 203, for example an end-point 1 to a statically configured or a discovered third party gatekeeper 201. In order for the B2BPG 201 to proxy an end-point 203, all gatekeepers need to statically point to the B2BPG 202. The B2BPG 202 is considered as the first option gatekeeper.

The end-point requests for registration with the third party gatekeeper 201 by relaying an RRQ 301 message to the B2BPG 202. The RRQ 301 is sent to the third party gatekeeper's RAS channel transport address.

The B2BPG 202 in turn relays the RRQ 301 to the third party gatekeeper 201. A PN_REG1 timer is started after the RRQ 301, and this timer handles two distinct phases of the registration procedures initiated by the B2BPG 202. On receiving the RRQ 301, the third party gatekeeper 201 relays a request confirm (RCF) message 302 back to the B2BPG 202. The B2BPG 202 updates the end-point (EP) registration table for the end-point 203. The EP registration table holds the discovered third party gatekeeper(s) for an end-point 203. The EP registration table is updated during end-point 203 registration, or unregistration procedures triggered by an end-point 203. The EP registration table is used as a translation table. For a normal gate-keeping functionality, the translation table is looked up to process location request (LRQ) message. The B2BPG 202 also updates the alternate gatekeeper list to be used during RRQ 301 processing and relays the request confirm (RCF) 302 back to end-point 203. The PN_REG1 timer is stopped when the B2BPG 202 receives the RCF 302.

If the B2BPG 202 receives an RCF 302 for an RRQ 301 from end-point 203 having the same alias address, or list of alias addresses, and the same transport addresses as an active registration, it forwards the RCF 302 to the endpoint 203.

If the B2BPG 202 receives an RCF 302 for an RRQ 301 from end-point 203 having the same alias address, or list of alias addresses as an active registration but different transport addresses, it forwards the RCF 302 to the end-point 203. In this case, the B2BPG 202 also updates the EP_REGISTRATION table with the new TSAP address.

Consider the case where B2BPG 202 receives an RCF 302 for an RRQ 301 having the same transport addresses as an active registration and a different alias address, or list of alias addresses; and the RRQ 301 is not specified to be an additive RRQ 301. In this case, the B2BPG 202 replaces the translation table, i.e., EP_REGISTRATION, entries.

If the B2BPG 202 receives a RRJ for any of the cases above, it forwards the RRJ to the corresponding end-point and the EP_REGISTRATION table is not changed. The B2BPG 202 will then ignore any further fresh responses from the same RRQ 301.

Figure 3B:
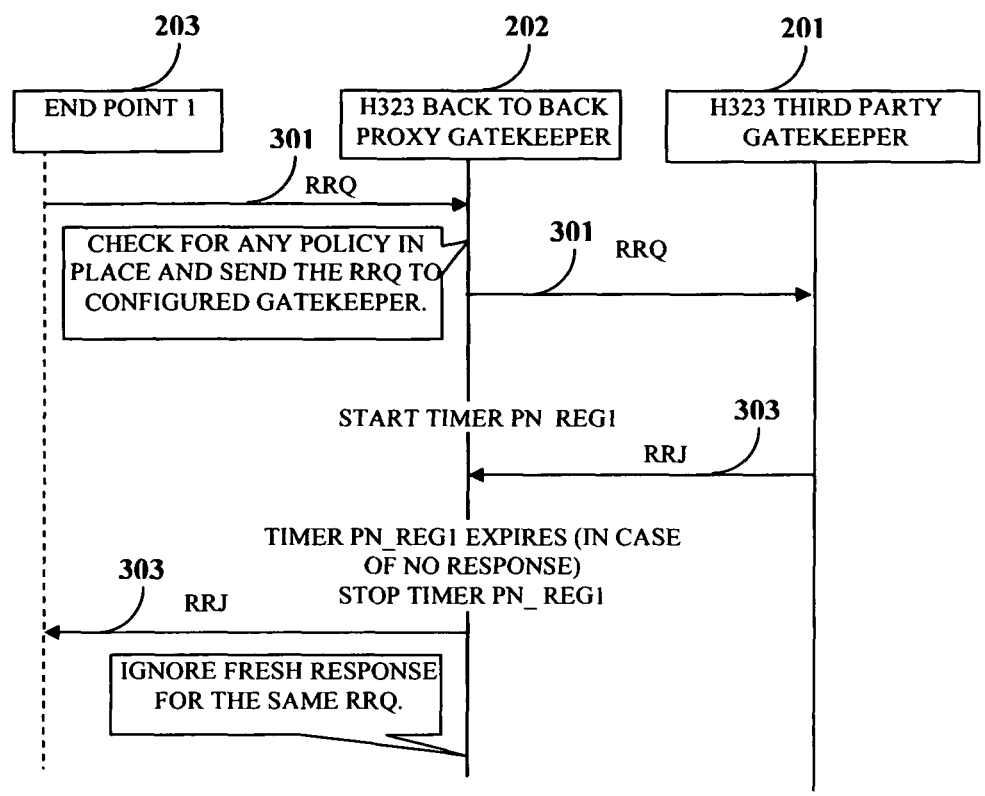
FIG. 3B illustrates the message sequence chart (MSC) for a registration request (RRQ) sent by end-points to a statically configured third party gatekeeper and its associated request rejection (RRJ).

FIG. 3B illustrates the message sequence chart (MSC) for a registration request (RRQ) 301 sent by end-point 203, for example an end-point 1 to a statically configured third party gatekeeper 201 and its associated request rejection (RRJ) 303. The end-point 203 requests for registration with the third party gatekeeper 201 by relaying an RRQ 301 message to the B2BPG 202. On receiving the RRQ 301 message, the B2BPG 202 relays the request to the third party gatekeeper 201. A PN_REG1 timer is started after the RRQ 301 message. In response to the RRQ 301 message from the B2BPG 202, the third party gatekeeper 201 relays a registration reject (RRJ) 303 message back to the B2BPG 202. If there is no response from the third party gatekeeper 201 within the time period set by the timer, the B2BPG 202 sends an RRJ 303 message back to end-point 203. The third party gatekeeper 201 relays a registration reject (RRJ) 303 message to the B2BPG 202.

Figure 4A:
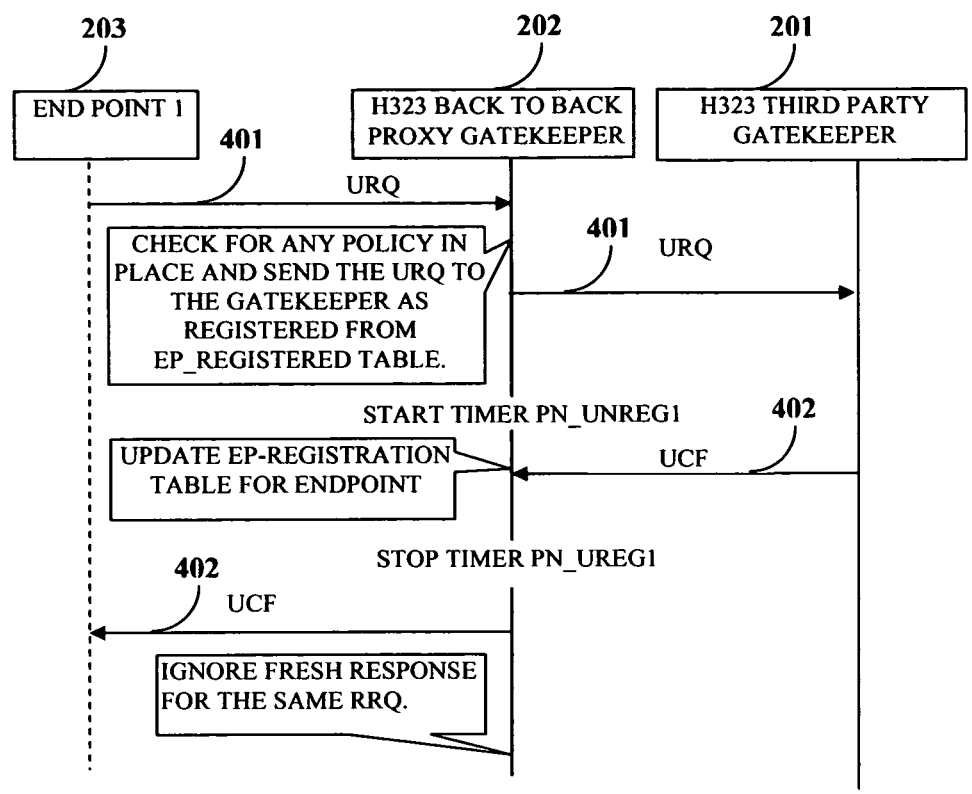
FIG. 4A illustrates the message sequence chart (MSC) for an unregister request (URQ) sent by end-points to a statically configured third party gatekeeper and the associated unregister confirmation (UCF) response from the third party gatekeeper.

FIG. 4A illustrates the message sequence chart (MSC) for an unregister request (URQ) 401 sent by end-points to a statically configured third party gatekeeper 201 and the associated unregister confirmation (UCF) response 402 from the third party gatekeeper 201. An end-point 203 cancels its registration by sending an URQ 401 message to a statically configured or a discovered third party gatekeeper 201. This allows an end-point to change the alias address associated with its transport address or vice versa. In accordance with its policy, the third party gatekeeper 201 will respond with either an unregister confirmation (UCF) 402 message, or an unregister Reject (URJ) message.

The end-point 203 requests for unregistration with the third party gatekeeper 201 by relaying an URQ 401 message to the B2BPG 202. The B2BPG 202 in turn relays the URQ 401 to the third party gatekeeper 201 as registered from the EP_REGISTERED table. A PN_UREG1 timer is started after the URQ 401 is sent to the third party gatekeeper 201 by the B2BPG 202. On receiving the URQ 401, the third party gatekeeper 201 relays an unregister confirm (UCF) 402 message back to the B2BPG 202. The B2BPG 202 updates the EP registration table for the end-point 203 and relays back the UCF 402 to the end-point 203. The PN_UREG1 timer is stopped when the B2BPG 202 receives the UCF 402. If the end-point 203 sends an URQ 401 message containing a list of alias addresses, the third party gatekeeper 201 will only unregister the listed aliases if it chooses to accept the request.

If the end-point 203 sends a URQ 401 message that does not contain any alias addresses, the third party gatekeeper 201 will unregister all aliases, if any for the end-point 203, if it chooses to accept the request. The B2BPG 202 will ignore fresh responses from the same URQ 401.

Figure 4B:
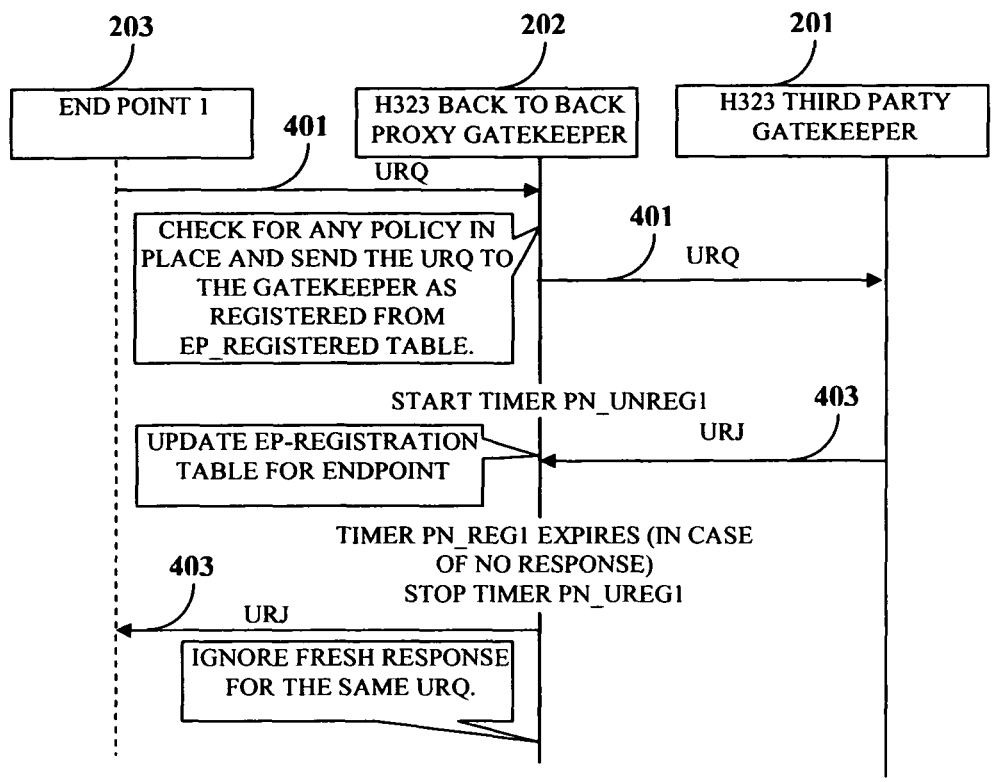
FIG. 4B illustrates the message sequence chart (MSC) for an unregister request (URQ) sent by end-points to a statically configured third party gatekeeper and the associated unregister reject (URJ) response from the third party gatekeeper.

FIG. 4B illustrates the message sequence chart (MSC) for an unregister request (URQ) 401 sent by end-point 203, for example an end-point 1 to a statically configured third party gatekeeper 201 and the associated unregister reject (URJ) 403 response from the third party gatekeeper 201. The end-point 203 requests for unregistration with the third party gatekeeper 201 by relaying an URQ 401 message to the B2BPG 202. The B2BPG 202 in turn relays the URQ 401 to the third party gatekeeper 201 as registered from the EP_REGISTERED table. A PN_UREG1 timer is started after the URQ 401 is sent by the B2BPG 202. On receiving the URQ 401, the third party gatekeeper 201 relays an unregister reject (URJ) 403 message back to the B2BPG 202. If there is no response from the third party gatekeeper 201 within the time period set by the timer, the B2BPG 202 sends an URJ 403 message back to end-point 203. The B2BPG 202 updates the EP registration table for the endpoint 203 and relays back the URJ 403 to the end-point 203. The B2BPG 202 will ignore fresh responses from the same URQ 401.

Figure 4C:
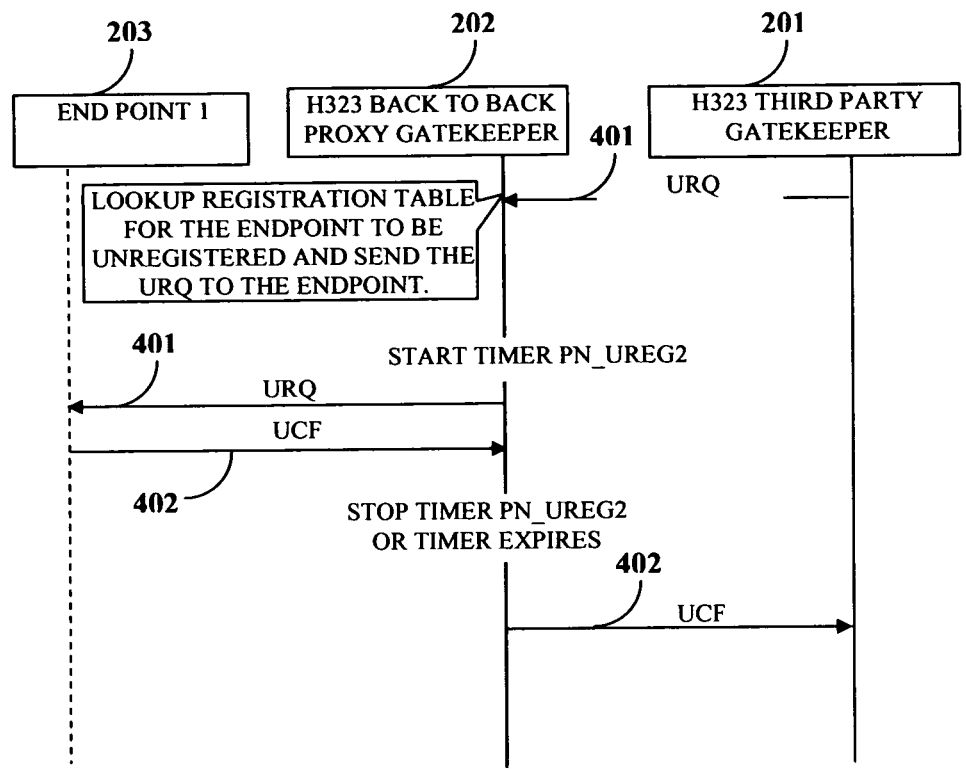
FIG. 4C illustrates the message sequence chart (MSC) for a third party initiated unregister request (URQ) and a successful unregister confirm response (UCF) from the end-point to a third party gatekeeper.

FIG. 4C illustrates the message sequence chart (MSC) for a third party initiated unregister request (URQ) 401 and a successful unregister confirm response (UCF) 402 from the end-point 203 to a third party gatekeeper 201. A third party gatekeeper 201 may cancel the registration of an end-point 203, for example an end point 1 by sending an URQ 401 message to the end-point 203. The end-point 203 will respond with an UCF 402 message. The endpoint 203 will attempt to re-register with the third party gatekeeper 201 prior to initiating any calls. This may require the end-point 203 to register with a new third party gatekeeper 201. If the third party gatekeeper 201 sends a URQ 401 message containing a list of alias addresses, the end-point 203 will assume that only those alias addresses are unregistered. A URQ 401 that contains no aliases indicates a request to unregister the end-point 203.

The third party gatekeeper 201 initiates a request to unregister with the end-point 203 by sending an URQ 401 message to the B2BPG 202. On receiving the URQ 401 from the third party gatekeeper 201, the B2BPG 202 looks into the EP_registration table for the end point 203 to be unregistered. A PN_T_UREG_2 timer is started after receiving the URQ 401 from the third party gatekeeper 201. The B2BPG 202 relays the URQ 401 message to the end point 203. On receiving the URQ 401, the end-point 203 sends an UCF 402 message back to the B2BPG 202. The PN_T_UREG_2 timer is stopped when the third party gatekeeper 201 receives the UCF 402.

Figure 5:
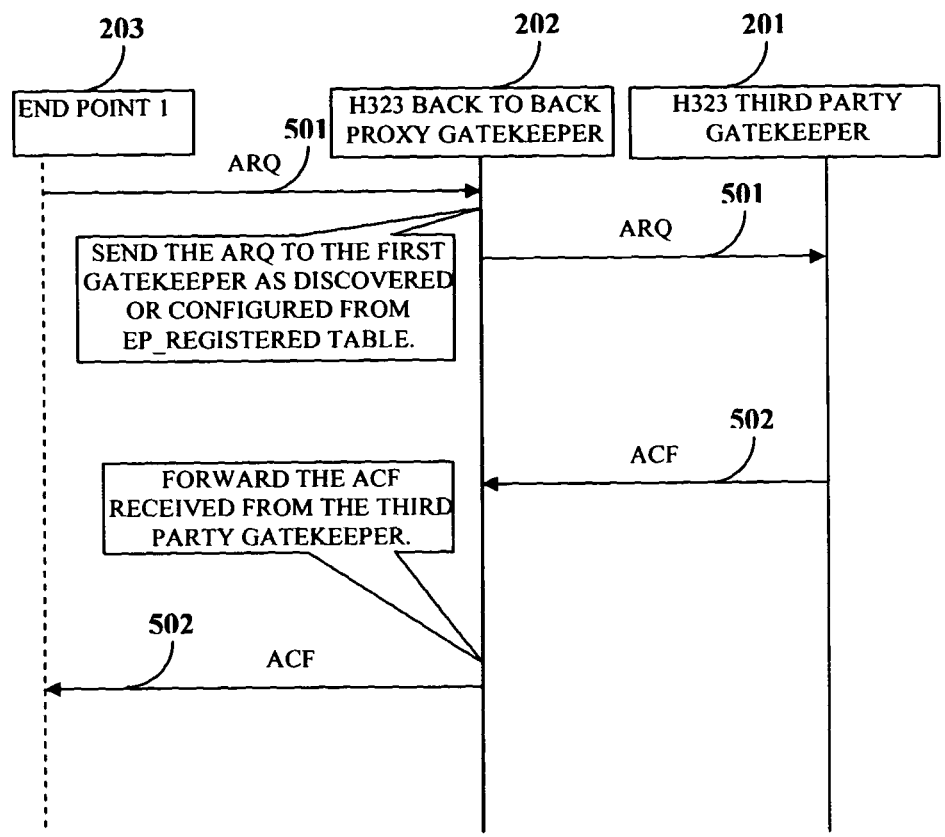
FIG. 5 illustrates the message sequence chart (MSC) for an admission request (ARQ) sent by an end-point to a statically configured third party gatekeeper and a successful admission confirm response (ACF) from the third party gatekeeper to the end-point.

FIG. 5 illustrates the message sequence chart (MSC) for an admission request (ARQ) 501 sent by an end-point 203, for example an end-point 1 to a statically configured third party gatekeeper 201 and a successful admission confirm response (ACF) 502 from the third party gatekeeper 201 to the end-point 203.

An ARQ 501 is sent by the end-point 203 to a statically configured or a discovered third party gatekeeper 201 for initiating a call. The ARQ 501 message specifies the requested call bandwidth. This is an upper limit on the aggregate bit rate for all transmitted and received, audio and video channels excluding any real time transport protocol (RTP) headers, real time transport protocol RTP payload headers, network headers, and other overhead. Data and control channels are not included in this limit. The third party gatekeeper 201 may reduce the requested call bandwidth in the admissions confirm (ACF) message. An end-point 203 will assure that the aggregate bit rate averaged over one second, for all transmitted and received, audio and video channels are at or below the call bandwidth. An end-point 203 or the third party gatekeeper 201 may attempt to modify the call bandwidth during a call using the bandwidth change request (BRQ) message.

The end-point 203 requests admission with the third party gatekeeper 201 by relaying an ARQ 501 message to the B2BPG 202. The B2BPG 202 relays the ARQ 501 to the third party gatekeeper 201 as discovered or configured from the EP registered table. The third party gatekeeper 201 sends an admission confirm (ACF) message 502 back to the B2BPG 202. The B2BPG 202 forwards the ACF 502 received from the third party gatekeeper 201 to the end-point 203.

Figure 6A:
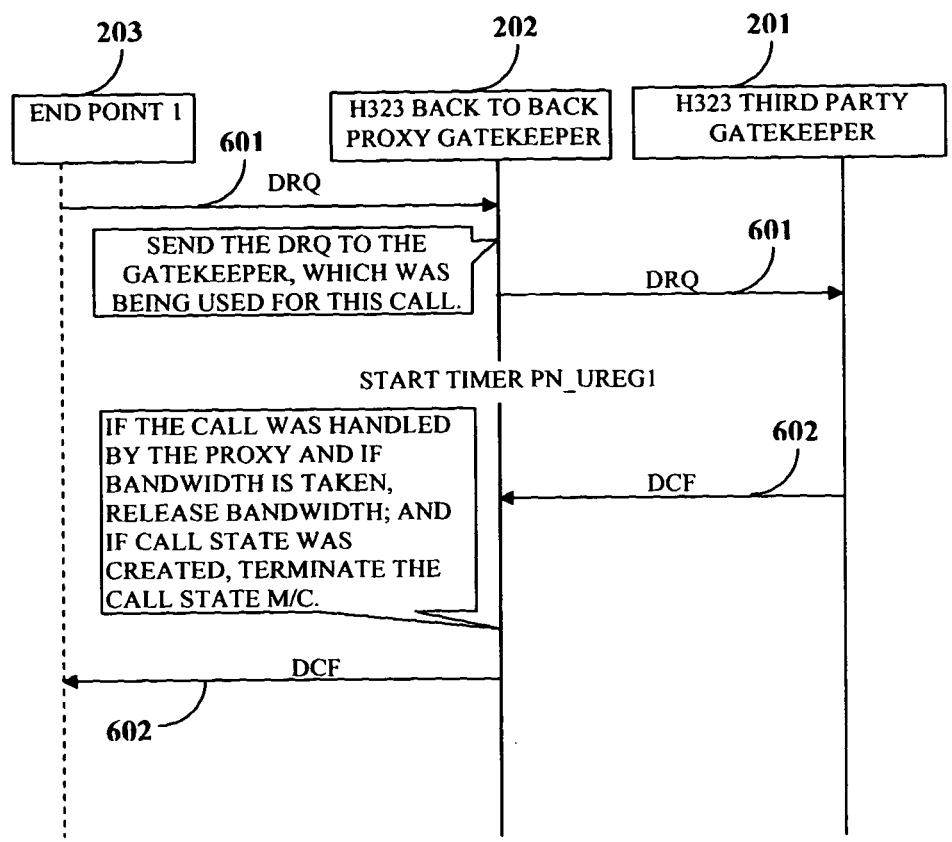
FIG. 6A illustrates the message sequence chart (MSC) for a disengage request (DRQ) sent by end-points to a statically configured third party gatekeeper to terminate a call and a disengage confirm (DCF) response from the third party gatekeeper to the end-point.

FIG. 6A illustrates the message sequence chart (MSC) for a disengage request (DRQ) 601 sent by end-point 203, for example an end-point 1 to a statically configured third party gatekeeper 201 to terminate a call and a disengage confirm (DCF) 602 response from the third party gatekeeper 201 to the end-point 203.

A DRQ 601 is sent by end-point 203 to a statically configured or a discovered third party gatekeeper 201 to terminate a call, to or from whom the call was initiated. The end-point 203 requests disengagement with the third party gatekeeper 201 by sending an DRQ 601 message to the B2BPG 202. On receiving the DRQ 601 message from the end-point, the B2BPG 202 terminates the call state machine created for a call and it also releases the bandwidth occupied for the call during ARQ 501. The DRQ 601 message is relayed to the third party gatekeeper 201. A disengage confirm (DCF) 602 message is relayed to the B2BPG 202 from the third party gatekeeper 201. The B2BPG 202 relays the DCF 602 to the end-point 203.

Figure 6B:
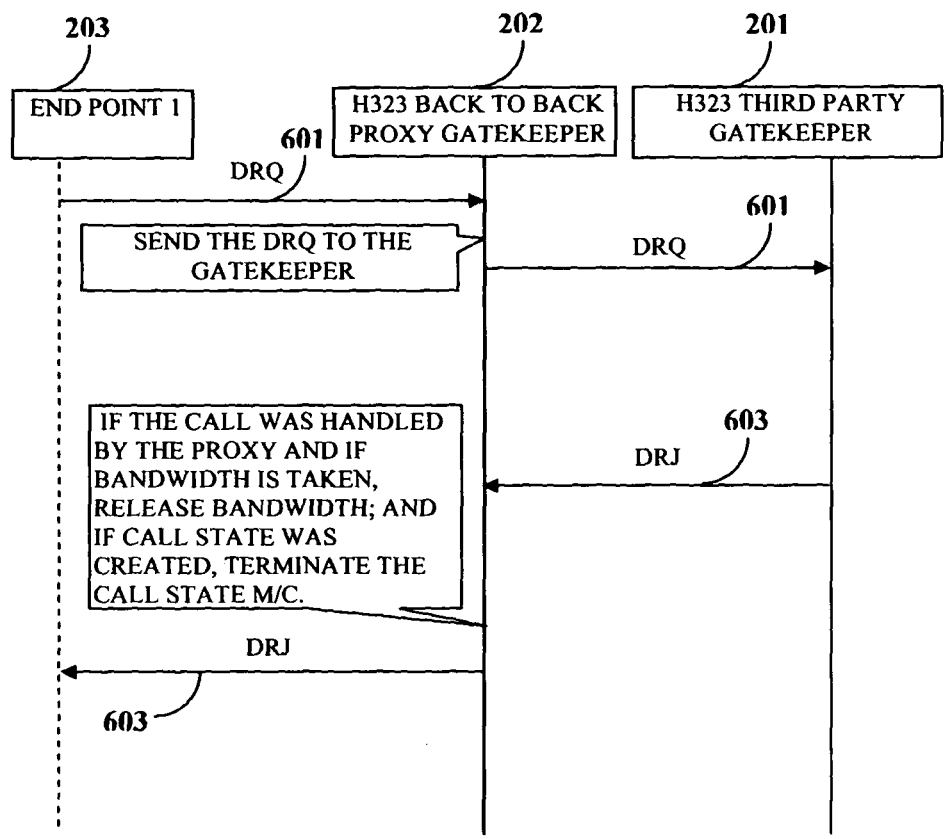
FIG. 6B illustrates the message sequence chart (MSC) for a disengage request (DRQ) sent by end-points to a statically configured third party gatekeeper to terminate a call and a disengage reject (DRJ) response from the third party gatekeeper to the end-point.

FIG. 6B illustrates the message sequence chart (MSC) for a disengage request (DRQ) 601 sent by end-point 203, for example an end point 1 to a statically configured third party gatekeeper 201 to terminate a call and a disengage reject (DRJ) 603 response from the third party gatekeeper 201 to the end-point 203. A DRQ 601 is sent by end-point 203 to a statically configured or a discovered third party gatekeeper 201 to terminate a call, to or from where the call was initiated. The end-point 203 requests disengage with the third party gatekeeper 201 by sending a DRQ 601 message to the B2BPG 202. On receiving the DRQ 601 message from the end-point 203, the B2BPG 202 terminates the call state machine created for a call and it also releases the bandwidth occupied for the call during ARQ 501. The DRQ 601 message is relayed to the third party gatekeeper 201. A disengage reject (DRJ) 603 message is relayed to the B2BPG 202 from the third party gatekeeper 201. The B2BPG 202 relays the DRJ 603 to the end-point 203.

Figure 7:
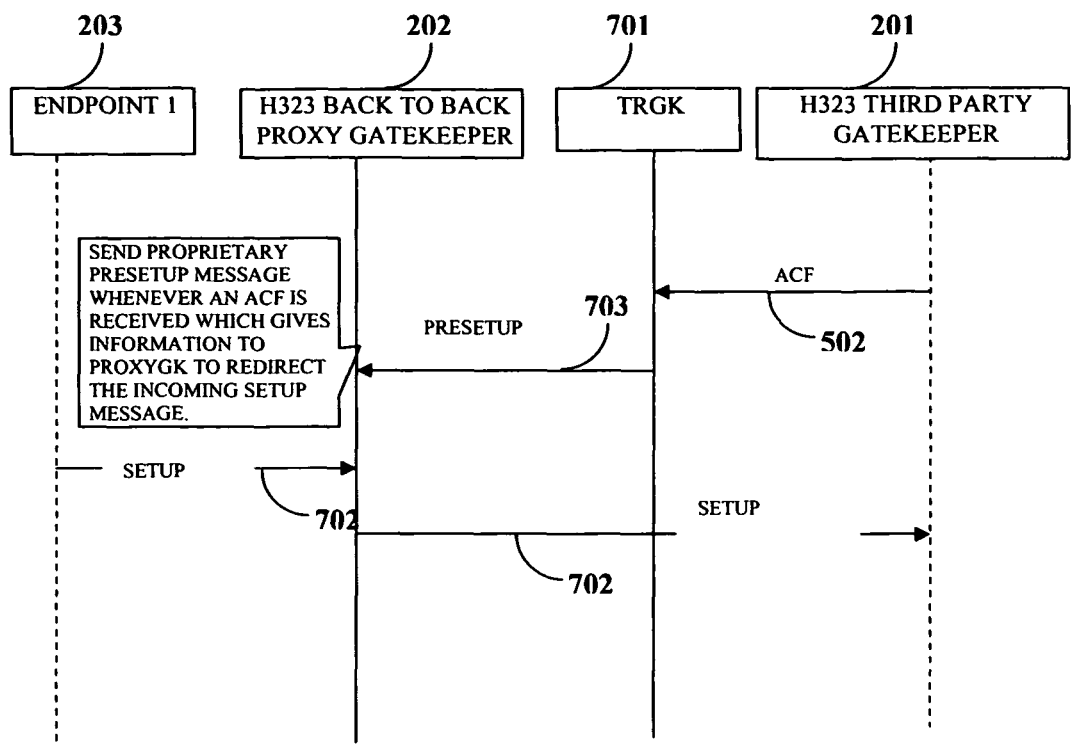
FIG. 7 illustrates the message sequence chart (MSC) for handling an out-going call setup.

FIG. 7 illustrates the message sequence chart (MSC) for handling an outgoing call setup. The B2BPG's 202 responsibility for the outgoing call is during the call admission ARQ/ACF stage. The B2BPG internally consists of two collaborating processes PROXYGK and TRGK. The ACF 502 message sent out to the TRGK 701 process will contain the destination IP address and default port (1720) of the mediaIP controller to direct the incoming setup. The TRGK 701 sends a PRESETUP message 703 to the B2BPG 202, giving the B2BPG 202 information for redirecting the incoming setup message. As B2BPG 202 listens on 1720 port for incoming Q.931 messages, the B2BPG 202 will get the incoming setup 702 messages. Based on the "destination alias address" and "conference ID" information given by the PRESETUP message 703, the B2BPG 202 will redirect the setup 702 to the appropriate destination either third party gatekeeper 201 or the destination endpoint 203. All the responses will directly go to the B2BPG 202 with no involvement of TRGK 701 except for sending a PRESETUP message 703 to prepare the B2BPG 202 for the incoming call.

Figure 8:
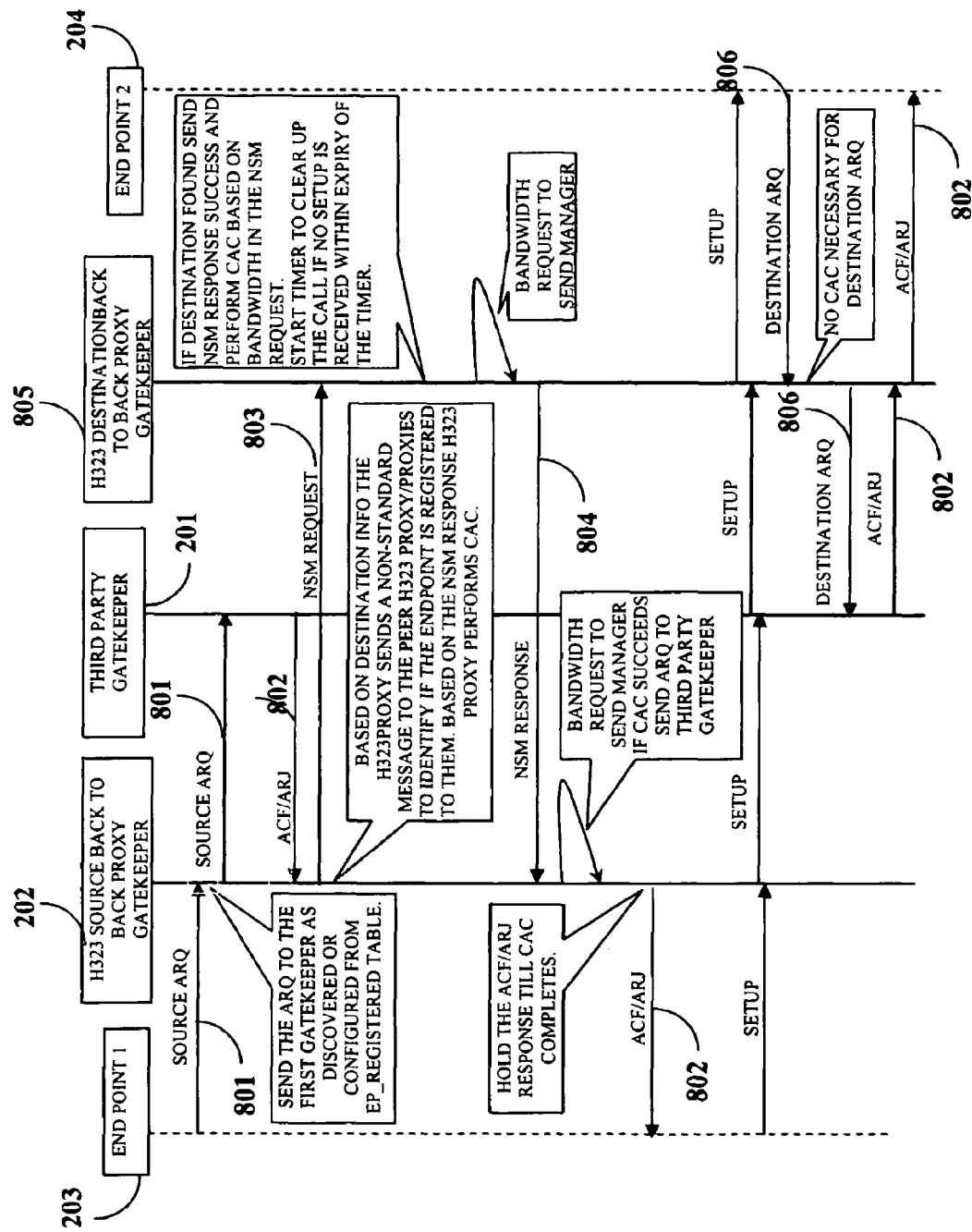
FIG. 8 illustrates the message sequence chart (MSC) for an ARQ with call or connection admission control (CAC).

FIG. 8 illustrates the message sequence chart (MSC) for an ARQ with call or connection admission control (CAC). When a source ARQ message 801 is received by the source B2BPG 202, the source B2BPG 202 will perform the following functions before forwarding that admission request to the third party gatekeeper 201: the source B2BPG 202 sends a nonstandard message (NSM) request 803 equivalent to a location request (LRQ) message, to the configured destination, querying the destination endpoint 204 information along with the bandwidth for the call. If the destination end-point 204 information is found, the destination B2BPG 805 requests for bandwidth from its respective send manager. On successful bandwidth allocation, the destination B2BPG 805 sends a positive NSM response 804 back to the source B2BPG 202.

The destination B2BPG 805 will also start a timer in the event a policy or rule configured on the third party gatekeeper 201, such as call forwarding, unconditionally redirects the call to another B2BPG. In this case, the destination B2BPG 805 waits for the expiry of the period set by a timer before clearing up the call.

On receiving a successful NSM response 804, the source B2BPG 202 will perform its own CAC by sending a BW request to the send manager. The source B2BPG 202 will always forward the source ARQ 801 to the third party gatekeeper 201. SendManager is a process on the MediaIP controller that is responsible for bandwidth related functions. It interacts with B2BPG for reserving and releasing bandwidth for calls. Depending on the admission request response from the third party gatekeeper 201 and bandwidth allocation on the source and destination B2BPGs, the ACF/ARJ 802 will be changed before being forwarded to the local end-point 203. In case there is a forwarding or other rule on the third party gatekeeper 201 and calls have to be sent to a different endpoint, the source B2BPG 202 for the call will need to determine that the call is forwarded by reviewing the destination call signaling information elements for the ACF message received on the end-point. If the calls have to be sent to a different end-point, the source B2BPG 202 will send a bandwidth release NSM message 803 to the destination B2BPG 805, thereby releasing the bandwidth for that call and also releasing the bandwidth on the source B2BPG 202.

A source ARQ 801 is sent by an end-point 203 to a statically configured or a discovered third party gatekeeper 201 to whom the endpoint 203 is registered for initiating a call. The ARQ message specifies the requested call bandwidth. This is an upper limit on the aggregate bit rate for all transmitted and received, audio and video channels excluding any RTP headers, RTP payload headers, network headers, and other overhead. Data and control channels are not included in this upper limit.

The third party gatekeeper 201 may reduce the requested call bandwidth in the ACF message 802. An end-point 203 will assure that the aggregate bit rate averaged over one second, for all transmitted and received, audio and video channels, is at or below the call bandwidth. An end-point 203 or the third party gatekeeper 201 may attempt to modify the call bandwidth during a call using the bandwidth change request (BRQ) message.

Implementation of TRGK relies on the third party gatekeeper to perform call admission control (CAC) or toll-bypass based on the requested bandwidth in the destination ARQ message 806. In order to support zone based CAC in TRGK mode, determine if the destination for the particular call is the destination B2BPG 202, in which case the perform CAC is performed. If the destination endpoint information is not the B2BPG 202, let the destination ARQ 806 go to the third party gatekeeper 201. In response to the destination ARQ 806 the third party gatekeeper 201 sends an ACF/ARJ 802 to the end-point 2 204.

While one or more examples or embodiments of the back-to-back H.323 proxy gatekeeper method and system have been described in the specification, those skilled in the art will recognize that changes and modifications may be made thereto without departing from the spirit of the invention, and it is intended to claim all such changes and modifications that fall within the scope of the method and system as defined by the claims herein.

What is claimed is:

1. A method comprising:
   creating a first set of ports and a second set of ports on a proxy gatekeeper that is transparently coupled between a gatekeeper and a plurality of end-points, wherein the first set of ports represents one or more ports of the gatekeeper to the plurality of end-points and the second set of ports represents ports of the plurality of end-points to the gatekeeper;
   receiving a H.323 registration request (RRQ) initiated from an end-point of the plurality of end-points at a port of the first set of ports of the proxy gatekeeper, wherein the H.323 registration request (RRQ) is addressed to a port of the one or more ports of the gatekeeper;
   storing information provided with the H.323 registration request (RRQ) in a storage device associated with the proxy gatekeeper;
   sending, from the proxy gatekeeper, the H.323 registration request (RRQ) to the port of the gatekeeper;
   sending, from the proxy gatekeeper, a non-standard message (NSM) request in response to receiving an H.323 admission request (ARQ) initiated from an end-point at the port of the first set of ports of the proxy gatekeeper; and
   receiving a NSM response.

2. The method of claim 1 wherein storing information provided with the H.323 registration request (RRQ) includes storing information to register the end-point in an end-point registration table maintained by the proxy gatekeeper.

3. The method of claim 2 wherein the information includes translation information.

4. The method of claim 2 further comprising updating the end-point registration table with additional information included with a request confirm (RCF) message sent by the gatekeeper in response to the H.323 registration request (RRQ).

5. The method of claim 4 wherein the additional information comprises at least one of a new transport address and a new alias address.

6. The method of claim 1 wherein the plurality of end-points, the gatekeeper, and the proxy gatekeeper reside within a common H.323 zone.

7. The method of claim 1 wherein the H.323 registration request (RRQ) initiated from the end-point specifies an internet address and a port of the end-point, and wherein the H.323 registration request (RRQ) sent to the gatekeeper specifies the same internet address but a different port.

8. The method of claim 1, further comprising creating the first set of ports and the second set of ports on the proxy gatekeeper prior to receiving the H.323 registration request that is transparently coupled between the gatekeeper and the plurality of end-points.

9. The method of claim 1, wherein the NSM response is received at the proxy gatekeeper in response to a bandwidth allocation.

10. A system, comprising:
    a gatekeeper; and
    a proxy gatekeeper transparently coupled between the gatekeeper and a plurality of endpoints, the proxy gatekeeper including a first set of ports that represent one or more ports of the gatekeeper to the plurality of end-points and a second set of ports that represent ports of the plurality of end-points to the gatekeeper,
    wherein the proxy gatekeeper is configured to:
       receive a H.323 registration request (RRQ) initiated from an end-point of the plurality of end-points at a port of the first set of ports, wherein the H.323 registration request (RRQ) is addressed to a port of the one or more ports of the gatekeeper,
       store information provided with the H.323 registration request (RRQ) in a storage device associated with the proxy gatekeeper and to send the H.323 registration request (RRQ) to the port of the one or more ports of the gatekeeper,
       sending a non-standard message (NSM) request in response to receiving an H.323 admission request (ARQ) initiated from an end-point at the port of the first set of ports of the proxy gatekeeper, and
       receiving a NSM response.

11. The system of claim 10, wherein the proxy gatekeeper is integrated into a media aggregator that reserves a predetermined portion of available bandwidth by establishing a reservation protocol session with one or more other media aggregators prior to establishment of any application sessions between one of the plurality of end-points and another end-point that share resources associated with the reservation protocol session.

12. A proxy gatekeeper operable in a system including a gatekeeper and a plurality of end-points, the proxy gatekeeper comprising:
    a first set of ports that represents one or more ports of the gatekeeper to the plurality of end-points;
    a second set of ports that represents ports of the plurality of end-points to the gatekeeper; and
    a storage device;
       wherein the proxy gatekeeper is transparently coupled between the gatekeeper and the plurality of end-points, and
       wherein the proxy gatekeeper is configured to:
          receive a H.323 registration request (RRQ) initiated from an end-point of the plurality of end-points at a port of the first set of ports, H.323 registration request (RRQ) is addressed to a port of the one or more ports of the gatekeeper,
          store information provided with the H.323 registration request (RRQ) in the storage device and to send the H.323 registration request (RRQ) to the port of the one or more ports of the gatekeeper,
          sending a non-standard message (NSM) In response to receiving an H.323 admission request (ARQ) initiated from an end-point at the port of the first set of ports of the proxy, gatekeeper, and
          receiving a NSM response.

13. The proxy gatekeeper of claim 12 further configured to access translation information contained in an EP registration table in the proxy gatekeeper in response to receiving a process location request (LRQ).

14. The proxy gatekeeper of claim 13 wherein the proxy gatekeeper is further configured to receive a request confirm (RCF) message from the gatekeeper in response to the H.323 registration request (RRQ), and wherein the proxy gatekeeper is further configured to update entries of the EP registration table in response to the request confirm (RCF) message having the same transport address as an active registration and a different alias address.

15. The proxy gatekeeper as recited in claim 13 wherein the proxy gatekeeper is further configured to receive a request confirm (RCF) message from the gatekeeper in response to the H.323 registration request (RRQ), and wherein the proxy gatekeeper is further configured to update the EP registration table with the new transport address in response to the request confirm (RCF) message having an alias address or alias addresses of an active registration and new transport address.

16. The proxy gatekeeper of claim 12 further configured to send the H.323 registration request (RRQ) to the gatekeeper by sending the H.323 registration request (RRQ) to a RAS channel transport address of the gatekeeper.

17. The proxy gatekeeper of claim 12, wherein the proxy gatekeeper is integrated into a media aggregator, and wherein the media aggregator is configured to reserve a predetermined portion of available bandwidth by establishing a reservation protocol session with one or more other media aggregators prior to establishment of any application sessions between one of the plurality of end-points and another end-point that share resources associated with the reservation protocol session.

18. The proxy gatekeeper of claim 17 further configured to initialize and set up calls and channels, manage the calls and channels, and close the calls and channels.

19. The proxy gatekeeper of claim 12 further configured to store translation information provided with the H.323 registration request (RRQ) in an end-point registration table maintained by the proxy gatekeeper.

20. A proxy gatekeeper operable in a system including a gatekeeper and a plurality of end-points, wherein the proxy gatekeeper is transparently coupled between the gatekeeper and the plurality of end-points, the proxy gatekeeper comprising:
    a computing device; and
    a memory having stored thereon computer-executable instructions execution of which by the computing device causes the computing device to perform operations including:
        creating a first set of ports and a second set of ports, wherein the first set of ports represents one or more ports of the gatekeeper to the plurality of end-points and the second set of ports represents ports of the plurality of end-points to the gatekeeper;
        receiving a H.323 registration request (RRQ) initiated from an end-point of the plurality of end-points at a port of the first set of ports of the proxy gatekeeper, wherein the H.323 registration request (RRQ) is addressed to a port of the one or more ports of the gatekeeper;
        storing information provided with the H.323 registration request (RRQ) in an endpoint registration storage of the proxy gatekeeper;
        sending the H.323 registration request (RRQ) to the port of the gatekeeper;
        sending a non-standard message (NSM) request in response to receiving an H.323 admission request (ARQ) initiated from an end-point at he port of the first set of ports of the proxy gatekeeper; and
        receiving a NSM response.

21. The proxy gatekeeper of claim 20 wherein the operations further include:
    receiving a H.323 admission request (ARQ) initiated from the end-point at the port of the first set of ports of the proxy gatekeeper; and
    sending the H.323 admission request to the port of the gatekeeper.

22. The proxy gatekeeper of claim 21 wherein the operations further include allocating bandwidth for a call in response to receiving the admission request.

23. The proxy gatekeeper of claim 22 wherein the operations further include terminating a call state machine created for the call in response to receiving a disengage request (DRQ).

24. The proxy gatekeeper of claim 22 wherein the operations further include releasing the bandwidth for the call in response to receiving a disengage request (DRQ).

25. The proxy gatekeeper of claim 21 wherein storing information provided with the H.323 registration request includes storing information to register the end-point in an end-point registration table maintained by the proxy gatekeeper.

26. The proxy gatekeeper of claim 25 wherein the information includes translation information.

27. The proxy gatekeeper of claim 21 wherein the operations included with a request confirm (RCF) message sent by the gatekeeper in response to the H.323 registration request (RRQ).

28. A non-transitory machine-readable medium having stored thereon instructions execution of which by a computing device serving as a proxy gateway transparently coupled between a gatekeeper and a plurality of end-points causes the computing device to perform operations comprising:
    creating a first set of ports and a second set of ports on the proxy gateway, wherein the first set of ports represents one or more ports of the gatekeeper to the plurality of end-points and the second set of ports represents ports of the plurality of end-points to the gatekeeper;
    receiving a H.323 registration request (RRQ) initiated from an end-point of the plurality of end-points at a port of the first set of ports of the proxy gatekeeper, wherein the H.323 registration request (RRQ) is addressed to a port of the one or more ports of the gatekeeper;
    storing information provided with the H.323 registration request (RRQ) in an end-point registration storage of the proxy gatekeeper;
    sending the H.323 registration request (RRQ) to the port of the gatekeeper;
    sending a non-standard message (NSM) request in response to receiving an H.323 admission request (ARQ) initiated from an end-point at the sort of the first set of ports of the proxy gatekeeper; and
    receiving a NSM response.

29. The non-transitory machine-readable medium of claim 28 wherein the operations further comprise:
    receiving a H.323 admission request (ARQ) initiated from the end-point at the port of the first set of ports of the proxy gatekeeper; and
    sending the H.323 admission request to the port of the gatekeeper.

30. The non-transitory machine-readable medium of claim 29 wherein the operations further include allocating bandwidth for a call in response to receiving the admission request.

31. The non-transitory machine-readable medium of claim 30 wherein the operations further include terminating a call state machine created for the call in response to receiving a disengage request (DRQ).

32. The non-transitory machine-readable medium of claim 31 wherein the operations further include releasing the bandwidth for the call in response to receiving a disengage request (DRQ).

33. The non-transitory machine-readable medium of claim 28 wherein storing information provided with the H.323 registration request (RRQ) includes storing information to register the end-point in an end-point registration table maintained by the proxy gatekeeper.

34. The non-transitory machine-readable medium of claim 28 wherein the information includes address translation information.

35. The non-transitory machine-readable medium of claim 28 wherein the H.323 registration request (RRQ) initiated from the end-point specifies an internet address and a port of the end-point, and wherein the H.323 registration request (RRQ) sent to the gatekeeper specifies the same internet address but a different port.

36. A proxy gatekeeper device operable in a system including a gatekeeper and a plurality of end-points, wherein the proxy gatekeeper device is transparently coupled between the gatekeeper and the plurality of end-points, the proxy gatekeeper device comprising:
  means for creating a first set of ports and a second set of ports on the proxy gatekeeper device, wherein the first set of ports represents one or more ports of the gatekeeper to the plurality of end-points and the second set of ports represents ports of the plurality of end-points to the gatekeeper;
  means for receiving a H.323 registration request (RRQ) initiated from an end-point of the plurality of end-points at a port of the first set of ports of the proxy gatekeeper device, wherein the H.323 registration request (RRQ) is addressed to a port of the one or more ports of the gatekeeper;
  hardware means for storing registration information provided with the H.323 registration request (RRQ);
  means for sending the H.323 registration request (RRQ) to the port of the gatekeeper;
  means for sending a non-standard message (NSM) request in response to receiving an H.323 admission request (ARQ) initiated from an end-point of the ports of the proxy gatekeeper; and
  means for receiving a NSM response.

37. The proxy gatekeeper device of claim 36 further comprising means for updating an end-point registration table with additional information included with a request confirm (RCF) message sent by the gatekeeper in response to the H.323 registration request (RRQ).

* * * * *

UNITED STATES PATENT AND TRADEMARK OFFICE
CERTIFICATE OF CORRECTION

PATENT NO.        : 8,428,074 B2
APPLICATION NO.   : 11/409661
DATED             : April 23, 2013
INVENTOR(S)       : Nag et al.

It is certified that error appears in the above-identified patent and that said Letters Patent is hereby corrected as shown below:

The title page should be deleted and substitute therefor the attached title page.

On the title page, item (57), under "ABSTRACT", in Column 2, Line 2, delete "H. 323" and insert -- H.323 --, therefor.

On the title page, in the Figure, for Tag "805", in Line 1, delete "DESTINATIONBACK" and insert -- DESTINATION BACK --, therefor.

On the title page, in the Figure, delete " 802 " and insert -- 802 --, therefor.

On title page 4, item (56), under "OTHER PUBLICATIONS", in Column 1, Line 68, delete "ft://" and insert -- ftp:// --, therefor.

In the Drawings

In Fig. 8, Sheet 12 of 12, for Tag "805", in Line 1, delete "DESTINATIONBACK" and insert -- DESTINATION BACK --, therefor.

In Fig. 8, Sheet 12 of 12, delete " 802 " and insert -- 802 --, therefor.

In the Specifications

In Column 2, Line 2, delete "(MCU)." and insert -- (MCUs). --, therefor.

Signed and Sealed this
Twenty-ninth Day of April, 2014

Michelle K. Lee
*Deputy Director of the United States Patent and Trademark Office*

CERTIFICATE OF CORRECTION (continued)
U.S. Pat. No. 8,428,074 B2

In Column 5, Line 64, delete "B2BGP" and insert -- B2BPG --, therefor.

In Column 6, Line 46, delete "B2BPG 201" and insert -- B2BPG 202 --, therefor.

In Column 11, Line 1, delete "in which case the perform" and insert -- in which the --, therefor.

In the Claims

In Column 12, Line 50, in Claim 12, delete "H.323" and insert -- the H.323 --, therefor.

In Column 12, Line 57, in Claim 12, delete "(NSM) In" and insert -- (NSM) request in --, therefor.

In Column 12, Line 60, in Claim 12, delete "proxy," and insert -- proxy --, therefor.

In Column 13, Line 63, in Claim 20, delete "at he port" and insert -- at the port --, therefor.

In Column 14, Line 51, in Claim 28, delete "at the sort" and insert -- at the port --, therefor.

In Column 16, Line 17, in Claim 36, delete "end-point of the" and insert -- end-point at the port of the first set of --, therefor.

(12) United States Patent
Nag et al.

(10) Patent No.: US 8,428,074 B2
(45) Date of Patent: Apr. 23, 2013

(54) BACK-TO BACK H.323 PROXY GATEKEEPER

(75) Inventors: Siddhartha Nag, Holmdel, NJ (US); Bo Shu, Somerset, NJ (US); Rahul Gulati, Lawrence Harbor, NJ (US); Ilana Polyak, Staten Island, NY (US)

(73) Assignee: Prom KS Mgmt Limited Liability Company, Wilmington, DE (US)

( * ) Notice: Subject to any disclaimer, the term of this patent is extended or adjusted under 35 U.S.C. 154(b) by 566 days.

(21) Appl. No.: 11/409,661

(22) Filed: Apr. 24, 2006

(65) Prior Publication Data
US 2006/0245419 A1 Nov. 2, 2006

Related U.S. Application Data

(60) Provisional application No. 60/676,626, filed on Apr. 29, 2005.

(51) Int. Cl.
H04L 12/28 (2006.01)
H04L 12/66 (2006.01)

(52) U.S. Cl.
USPC .......................................... 370/401; 370/352

(58) Field of Classification Search ............... 370/401, 370/352
See application file for complete search history.

(56) References Cited

U.S. PATENT DOCUMENTS

| | | |
|---|---|---|
| 5,394,522 A | 2/1995 | Sanchez-Frank et al. |
| 5,640,595 A | 6/1997 | Baugher et al. |
| 5,809,282 A | 9/1998 | Cooper et al. |
| 5,826,242 A | 10/1998 | Montulli |
| 5,831,975 A | 11/1998 | Chen et al. |
| 5,884,037 A | 3/1999 | Aras et al. |

(Continued)

FOREIGN PATENT DOCUMENTS

| | | |
|---|---|---|
| EP | 632673 | 1/1995 |
| EP | 1017200 | 7/2000 |

(Continued)

OTHER PUBLICATIONS

"Non Final Office Action", U.S. Appl. No. 11/183,156, (Jul. 27, 2009), 11 pages.

(Continued)

*Primary Examiner* — Mark Rinehart
*Assistant Examiner* — Angel Brockman
(74) *Attorney, Agent, or Firm* — Brundidge & Stanger, P.C.

(57) ABSTRACT

Disclosed herein is a method of executing the RAS stage up to the set-up stage in a H.323 system. The H.323 system comprises one or more third party gatekeepers and one or more end points. A transparent back-to-back proxy gatekeeper is introduced between a third party gatekeeper and end-points. Two sets of ports are created on the transparent back-to-back proxy gatekeeper. One set of ports represent themselves as end-points to the third party gatekeeper and the other set of ports represent themselves as known ports of the third party gatekeeper to the end point. A H.323 RAS request is intercepted transparently from an end-point to a third party gatekeeper. The H.323 RAS request is addressed to a well-known port number on the third party gatekeeper. The information of the H.323 RAS registration request is stored in a local persistent copy within the back-to-back proxy gatekeeper. The H.323 RAS registration request is passed to the well-known port number on the third party gatekeeper.

37 Claims, 12 Drawing Sheets